US012723908B2

(12) United States Patent
Russell et al.

(10) Patent No.: US 12,723,908 B2
(45) Date of Patent: Sep. 1, 2026

(54) SCALE BASED UNLOAD RATE CALCULATION

(71) Applicant: Deere & Company, Moline, IL (US)

(72) Inventors: Ryan C. Russell, Orion, IL (US); Stephen R. Corban, Geneseo, IL (US)

(73) Assignee: Deere & Company, Moline, IL (US)

( * ) Notice: Subject to any disclaimer, the term of this patent is extended or adjusted under 35 U.S.C. 154(b) by 295 days.

(21) Appl. No.: 18/494,185

(22) Filed: Oct. 25, 2023

(65) Prior Publication Data

US 2025/0137832 A1 May 1, 2025

(51) Int. Cl.

| | |
|---|---|
| ***G01G 13/16*** | (2006.01) |
| ***A01D 41/12*** | (2006.01) |
| ***A01D 90/10*** | (2006.01) |
| ***G01G 23/365*** | (2006.01) |

(52) U.S. Cl.
CPC ......... *G01G 13/16* (2013.01); *A01D 41/1217* (2013.01); *A01D 90/10* (2013.01); *G01G 23/365* (2013.01)

(58) Field of Classification Search
CPC .. G01G 13/16; G01G 23/365; A01D 41/1217; A01D 90/10
See application file for complete search history.

(56) References Cited

U.S. PATENT DOCUMENTS 9,043,096 B2 5/2015 Zielke et al.
9,738,216 B2 8/2017 Kendrick et al.
9,763,389 B2 9/2017 Bump et al.
10,028,442 B1 7/2018 Crosby
12,004,447 B2 6/2024 Linde et al.
12,089,529 B2 9/2024 Rush
(Continued)

FOREIGN PATENT DOCUMENTS

AU 2017200593 B2 * 5/2019 ......... A01D 41/1271
DE 102008002006 12/2009
(Continued)

OTHER PUBLICATIONS

U.S. Appl. No. 18/494,171, filed Oct. 25, 2023, Application and Drawings, 80 pages.
(Continued)

*Primary Examiner* — Natalie Huls
(74) *Attorney, Agent, or Firm* — Christopher J. Volkmann; KELLY, HOLT & CHRISTENSON PLLC

(57) ABSTRACT

An agricultural system includes: one or more weight sensors that detect a weight of material in a first material receptacle and generate sensor data indicative thereof; one or more processors; memory; and computer executable instructions, stored in the memory, that, when executed by the one or more processors, configure the one or more processors to: determine a change in weight of material in the first material receptacle based on first sensor data indicative of a weight of material in the first material receptacle at a first time and second sensor data indicative of a weight of material in the first material receptacle at a second time; determine a material transfer rate indicative of a rate at which a material transfer subsystem transfers material based on the determined change in weight; and determine a fill level of material in a second material receptacle based on the determined material transfer rate.

20 Claims, 18 Drawing Sheets

(56) References Cited

U.S. PATENT DOCUMENTS

| | | | | |
|---|---|---|---|---|
| 2009/0083100 | A1 | 3/2009 | Darby, Jr. et al. | |
| 2010/0036645 | A1 | 2/2010 | McAree | |
| 2011/0307149 | A1 | 12/2011 | Pighi et al. | |
| 2012/0099948 | A1* | 4/2012 | Bump | B65G 69/00 414/21 |
| 2012/0200697 | A1* | 8/2012 | Wuestefeld | H04N 7/18 198/810.01 |
| 2012/0253611 | A1* | 10/2012 | Zielke | A01D 41/1275 701/50 |
| 2017/0370765 | A1* | 12/2017 | Meier | G01G 19/086 |
| 2019/0302794 | A1 | 10/2019 | Kean et al. | |
| 2020/0073543 | A1 | 3/2020 | Koch et al. | |
| 2020/0319655 | A1 | 10/2020 | Desai et al. | |
| 2020/0352099 | A1 | 11/2020 | Meier et al. | |
| 2021/0294337 | A1 | 9/2021 | Van Mill et al. | |
| 2021/0362705 | A1 | 11/2021 | Singh et al. | |
| 2022/0011444 | A1 | 1/2022 | Eichhorn et al. | |
| 2022/0019240 | A1 | 1/2022 | Christiansen et al. | |
| 2022/0410704 | A1* | 12/2022 | O'Connor | A01D 43/073 |
| 2023/0027697 | A1 | 1/2023 | Rush | |
| 2023/0061389 | A1 | 3/2023 | Bartek et al. | |
| 2023/0126679 | A1 | 4/2023 | Isaac | |
| 2024/0000011 | A1 | 1/2024 | Zielke et al. | |
| 2024/0130278 | A1* | 4/2024 | Waldo | A01D 90/10 |
| 2025/0133985 | A1* | 5/2025 | Vandike | B60P 3/2245 |
| 2025/0133986 | A1* | 5/2025 | Vandike | A01D 41/127 |
| 2025/0133988 | A1* | 5/2025 | Vandike | A01D 43/073 |

FOREIGN PATENT DOCUMENTS

| | | | |
|---|---|---|---|
| DE | 102009027245 | A1 | 12/2010 |
| DE | 102010043854 | A1 | 5/2012 |
| DE | 102012211001 | A1 | 1/2014 |
| EP | 2044826 | A2 | 4/2009 |
| EP | 3053428 | A1 | 8/2016 |
| JP | 2001269049 | A * | 10/2001 |
| WO | 2022061447 | A1 | 3/2022 |

OTHER PUBLICATIONS

U.S. Appl. No. 18/494,168 filled Oct. 25, 2023, Application and Drawings, 80 pages.

U.S. Appl. No. 18/494,180, filed Oct. 25, 2023, Application and Drawings, 79 pages.

Final Office Action for U.S. Appl. No. 18/494,168, dated Feb. 10, 2026, 76 pages.

Final Office Action for U.S. Appl. No. 18/494,171, dated Jan. 9, 2026, 126 pages.

Advisory Action for U.S. Appl. No. 18/494,171, dated Mar. 2, 2026, 04 Pages.

Non-Final Office Action for U.S. Appl. No. 18/494,168, dated Jul. 30, 2025, 43 Pages.

Non-Final Office Action for U.S. Appl. No. 18/494,180, mailed Dec. 22, 2025, 12 Pages.

Non-Final Office Action for U.S. Appl. No. 18/494,171, dated Apr. 6, 2026, 211 pages.

Advisory Action for U.S. Appl. No. 18/494,168, dated Mar. 23, 2026, 03 Pages.

* cited by examiner

INTERLOCK CONDITION SENSOR(S) 152

GEOGRAPHIC POSITION SENSOR(S) 388

HEADING/SPEED SENSOR(S) 390

CAMERA(S) 392

LIDAR SENSOR(S) 394

RADAR SENSOR(S) 396

ULTRASONIC SENSOR(S) 398

OTHER 399

MATERIAL TRANSFER STATUS SENSOR(S) 150

VIBRATION/FORCE SENSORS 370

CAMERA(S) 372

LIDAR SENSOR(S) 374

RADAR SENSOR(S) 376

ULTRASONIC SENSOR(S) 378

WEIGHT SENSOR(S) 380

MATERIAL LEVEL SENSOR(S) 382

TORQUE/POWER SENSOR(S) 384

CONTACT SENSOR(S) 386

OTHER 387

SCALE BASED UNLOAD RATE CALCULATION

The present description relates to agricultural operations. More specifically, the present description relates to monitoring material transfer operations between agricultural machines.

BACKGROUND

There are a wide variety of different types of agricultural machines. Some agricultural machines may carry material and transfer the material to another machine, such machines can be referred to as material transfer machines. Some agricultural machines may receive material from another machine and carry the material, such machines can be referred to as material receiving machines. In some examples, a machine may both receive material from another machine and transfer material to another machine. Thus, such machines can both be a material transfer machine and a material receiving machine. As an example, an agricultural harvester can be a material transfer machine. The agricultural harvester can harvest and store crop material (e.g., grain) on-board and also include a material transfer subsystem that can be used to transfer the crop material on-board the agricultural harvester to a receiving machine, such as a towed grain cart (e.g., towing vehicle and grain cart) or a grain truck (e.g., semi-truck and trailer). In some examples, a receiving machine, such as a towed grain cart, can also include a material transfer subsystem that can be used to transfer the crop on-board the grain cart (e.g., received from an agricultural harvester) to another receiving machine, such as a grain truck. Thus, some receiving machines, such as towed grain carts, can also be material transfer machines.

The discussion above is merely provided for general background information and is not intended to be used as an aid in determining the scope of the claimed subject matter.

SUMMARY

An agricultural system includes: one or more weight sensors that detect a weight of material in a first material receptacle and generate sensor data indicative thereof; one or more processors; memory; and computer executable instructions, stored in the memory, that, when executed by the one or more processors, configure the one or more processors to: determine a change in weight of material in the first material receptacle based on first sensor data indicative of a weight of material in the first material receptacle at a first time and second sensor data indicative of a weight of material in the first material receptacle at a second time; determine a material transfer rate indicative of a rate at which a material transfer subsystem transfers material based on the determined change in weight; and determine a fill level of material in a second material receptacle based on the determined material transfer rate.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
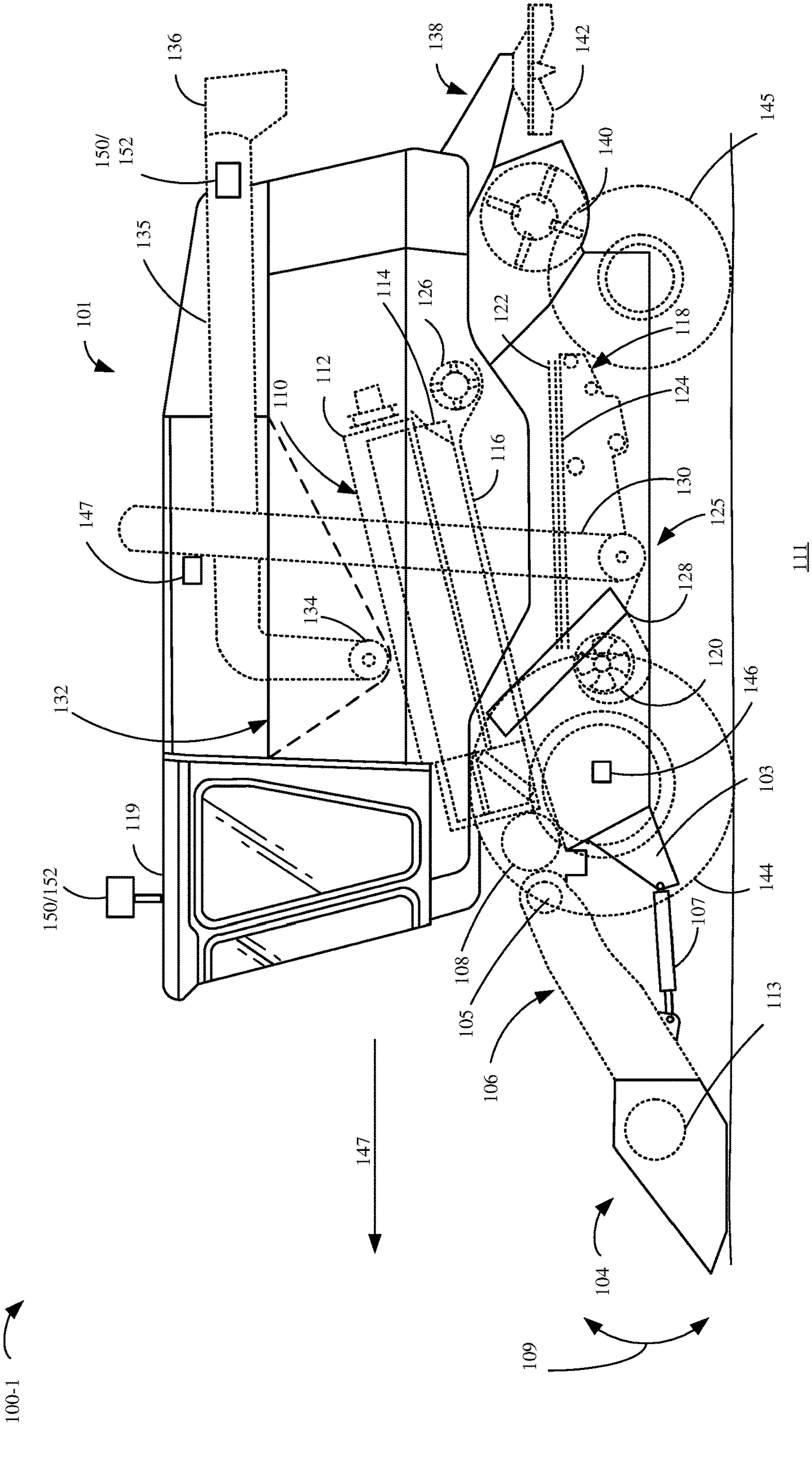
FIG. 1 is a partial pictorial, partial schematic illustration of one example material transfer machine.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

During some operations, such as harvesting, material is transferred from one machine to another (e.g., from an agricultural harvester to a towed grain cart or a grain truck or from a towed grain cart to a grain truck). It can be difficult for an operator of the material transfer machine to know when to initiate a material transfer operation (e.g., when on-board material tank is full, such as to a desired or threshold level) or when to end a material transfer operation (e.g., when the on-board material tank has been emptied, such as to a desired or threshold level). For example, operators of material transfer machines may be unable to observe the material transfer subsystem or the on-board material tank to determine when the transfer operation is complete. For instance, operators may have their attention drawn to other aspects of operation that may take place at the same time as the material transfer operation. In another example, the material transfer subsystem (or portions thereof) or the on-board material tank, or both, may not be observable from the position of the operator of the machine. Thus, it can be difficult for operators to effectively end a material transfer operation which may result in material spill or other inefficiencies.

Additionally, it can be difficult for an operator to know when it is appropriate to initiate or end a material transfer operation. Often, the material transfer subsystems of material transfer machines include items (e.g., chute and spout) that swing out and away (e.g., extend) from the material transfer machine (e.g., out and away from a storage position) in order to be positioned to transfer material to a material receiving machine (e.g., a deployed position). Additionally, when the material transfer operation is completed, the items are returned (e.g., retract) to their storage position. There may be conditions present at the worksite that make it undesirable to extend or retract the material transfer subsystem. Such conditions can be referred to as interlock conditions. Interlock conditions can include objects (e.g., other machines, obstacles, other objects at the worksite, etc.) in the swing path of the material transfer subsystem with which the material transfer subsystem may collide or otherwise encroach during extension or retraction or worksite boundaries in the swing path of the material transfer subsystem which the material transfer subsystem will cross during extension or retraction. It can be difficult for an operator to determine if interlock conditions are present, such as whether there are objects in the swing path of the material transfer subsystem or whether a worksite boundary is in the swing path of the material transfer subsystem and thus, operators may initiate or end material transfer operations (e.g., cause extension or retraction, respectively) at undesirable times (e.g., when objects are in the swing path, when a worksite boundary is in the swing path, etc.).

The present discussion proceeds, in some examples, with respect to systems and methods that determine the status of a material transfer operation including when a material transfer operation should be initiated (e.g., when the on-board material tank is full, at least to a desired or threshold level) and when a material transfer operation should be ended (e.g., when the on-board material tank is empty, at least to a desired or threshold level). Sensors on-board the material transfer machine or the material receiving machine, or both, can provide sensor data used to determine the status of the material transfer operation including when a material transfer operation should be initiated and when a material transfer operation should be ended. The determined status of the material transfer operation, can be presented to an operator (or other user) or can be used in automatic control of a mobile machine, or both. The present discussion also proceeds, in some examples, with respect to systems and methods that determine whether an interlock condition is present. Sensors on-board the material transfer machine or the material receiving machine, or both, can provide sensor data used to determine whether an interlock condition is present. The determined presence (or absence) of an interlock condition can be presented to an operator (or other user) or can be used in automatic control of a mobile machine, or both.

It will be noted that while the various examples discussed herein proceed in the context of mobile agricultural machines, the systems and methods described herein are applicable to and can be used in various other mobile work machines.

FIG. 1 is a partial pictorial, partial schematic illustration of a material transfer machine 100 (illustratively shown as 100-1). In the example shown in FIG. 1, material transfer machine 100-1 is in the form of an agricultural harvester 101. As illustrated in FIG. 1, harvester 101 includes ground engaging traction elements (wheels or tracks) 144 and 145 which can be driven by a propulsion subsystem (e.g., motor or engine and other drivetrain elements) to propel harvester 101 across a worksite 111 (e.g., a field). Harvester 101 includes an operator compartment or cab 119, which can include a variety of different operator interface mechanisms (e.g., 318 shown in FIG. 4) for controlling harvester 101 as well as for displaying various information. Harvester 101 includes a feeder house 106, a feed accelerator 108, and a thresher generally indicated at 110. The feeder house 106 and the feed accelerator 108 form part of a material handling subsystem 125. Header 104 is pivotally coupled to a frame 103 of harvester 101 along pivot axis 105. One or more actuators 107 drive movement of header 104 about axis 105 in the direction generally indicated by arrow 109. Thus, a vertical position of header 104 (the header height) above ground 111 over which the header 104 travels is controllable by actuating actuator 107. While not shown in FIG. 1, agricultural harvester 101 may also include one or more actuators that operate to apply a tilt angle, a roll angle, or both to the header 104 or portions of header 104.

Agricultural harvester 101 includes a material handling subsystem 125 that includes a thresher 110 which illustratively includes a threshing rotor 112 and a set of concaves 114. Further, material handling subsystem 125 also includes a separator 116. Agricultural harvester 101 also includes a cleaning subsystem or cleaning shoe (collectively referred to as cleaning subsystem 118) that includes a cleaning fan 120, chaffer 122, and sieve 124. The material handling subsystem also includes discharge beater 126, tailings elevator 128, and clean grain elevator 130. The clean grain elevator moves clean grain into a material receptacle (or clean grain tank) 132.

Harvester 101 also includes a material transfer subsystem that includes a conveying mechanism 134 and a chute 135. Chute 135 includes a spout 136. In some examples, spout 136 can be movably coupled to chute 135 such that spout 136 can be controllably rotated to change the orientation of spout 136. Conveying mechanism 134 can be a variety of different types of conveying mechanisms, such as an auger or blower. Conveying mechanism 134 is in communication with clean grain tank 132 and is driven (e.g., by an actuator, such as motor or engine) to convey material from grain tank 132 through chute 135 and spout 136. Chute 135 is rotatable through a range of positions from a storage position (shown in FIG. 1) to a variety of positions away from agricultural harvester 101 to align spout 136 relative to a material receptacle (e.g., grain cart, towed trailer, etc.) that is configured to receive the material within grain tank 132. Spout 136, in some examples, is also rotatable to adjust the direction of the material stream exiting spout 136.

Harvester 101 also includes a residue subsystem 138 that can include chopper 140 and spreader 142. Harvester 101 also includes a propulsion subsystem that includes an engine (or other form of power plant) that drives ground engaging traction components, such as 144 or 144 and 145 to propel the harvester 101 across a worksite such as a field (e.g., ground 111). In some examples, a harvester within the scope of the present disclosure may have more than one of any of the subsystems mentioned above. In some examples, harvester 101 may have left and right cleaning subsystems, separators, etc., which are not shown in FIG. 1.

In operation, and by way of overview, harvester 101 illustratively moves through a field 111 in the direction indicated by arrow 147. As harvester 101 moves, header 104 engages the crop plants to be harvested and cuts (with a cutter bar on the header 104, not shown in FIG. 2) the crop plants to generate cup crop material.

The cut crop material is engaged by a cross auger 113 which conveys the separated crop material to a center of the header 104 where the severed crop material is then moved through a conveyor in feeder house 106 toward feed accelerator 108, which accelerates the separated crop material into thresher 110. The separated crop material is threshed by rotor 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvester 101 in a windrow.

Grain falls to cleaning subsystem 118. Chaffer 122 separates some larger pieces of MOG from the grain, and sieve 124 separates some of finer pieces of MOG from the grain. The grain then falls to an auger that moves the grain to an inlet end of grain elevator 130, and the grain elevator 130 moves the grain upwards, depositing the grain in grain tank 132. Residue is removed from the cleaning subsystem 118 by airflow generated by cleaning fan 120. Cleaning fan 120 directs air along an airflow path upwardly through the sieves and chaffers. The airflow carries residue rearwardly in harvester 101 toward the residue handling subsystem 138.

Tailings elevator 128 returns tailings to thresher 110 where the tailings are re-threshed. Alternatively, the tailings also may be passed to a separate re-threshing mechanism by a tailings elevator or another transport device where the tailings are re-threshed as well.

Harvester 101 can include a variety of sensors, some of which are illustrated in FIG. 1, such as ground speed sensor 146, one or more mass flow sensors 147, and one or more material transfer status sensors 150/interlock condition sensors 152. In some examples, a sensor can provide sensor data used to determine a status of a material transfer operation and can provide sensor data use to determine the presence (or absence) of an interlock condition. Thus, in some examples, a sensor may be both a material transfer status sensor 150 and an interlock condition sensor 152. In some examples, material transfer status sensors 150 and interlock condition sensors 152 are separate.

Ground speed sensor 146 senses the travel speed of harvester 101 over the ground. Ground speed sensor 146 may sense the travel speed of the harvester 101 by sensing the speed of rotation of the ground engaging traction elements 144 or 145, or both, a drive shaft, an axle, or other components. In some instances, the travel speed may be sensed using a positioning system, such as a global positioning system (GPS), a dead reckoning system, a long range navigation (LORAN) system, a Doppler speed sensor, or a wide variety of other systems or sensors that provide an indication of travel speed. Ground speed sensors 146 can also include direction sensors such as a compass, a magnetometer, a gravimetric sensor, a gyroscope, GPS derivation, to determine the direction of travel in two or three dimensions in combination with the speed. This way, when harvester 101 is on a slope, the orientation of harvester 101 relative to the slope is known. For example, an orientation of harvester 101 could include ascending, descending or transversely travelling the slope.

Mass flow sensors 147 sense the mass flow of material (e.g., grain) through clean grain elevator 130. Mass flow sensors 147 may be disposed at various locations, such as within or at the outlet of clean grain elevator 130. In some examples, the mass flow rate of material sensed by mass flow sensors 147 is used in the calculation of yield as well as in the calculation of the fill level of the on-board material tank 132. In some examples, mass flow sensors 147 include an impact (or strike) plate that is impacted by material (e.g., grain) conveyed by clean grain elevator 130 and a force or load sensor that detects the force or load of impact of the material on the impact (or strike) plate. This is merely one example of a mass flow sensor.

Material transfer status sensors 150 can include one or more of a variety of sensors, such as cameras (e.g., mono or stereo cameras), Lidar, Radar, Ultrasonic sensors, as well as various other sensor configured to emit and/or receive electromagnetic radiation, weight or pressure sensors, contact sensors, power or torque sensors, vibration or force sensors, as well as a variety of other sensors. While FIG. 1 shows some example positions of material transfer status sensors 150, it will be understood that material transfer status sensors 150 can be positioned (or otherwise disposed) at a variety of other locations on harvester 101.

Interlock condition sensors 152 can include one or more of a variety of sensors, such as such as cameras (e.g., mono or stereo cameras), Lidar, Radar, Ultrasonic sensors, geographic position sensors, as well as a variety of other sensors. While FIG. 1 shows some example positions of interlock condition sensors 152, it will be understood that interlock condition sensors 152 can be positioned (or otherwise disposed) at a variety of other locations on harvester 101.

Material transfer status sensors 150 and interlock condition sensors 152 will be discussed in greater detail in FIG. 4.

Harvester 101 can include various other sensors, some of which will be discussed below.

Figure 2:
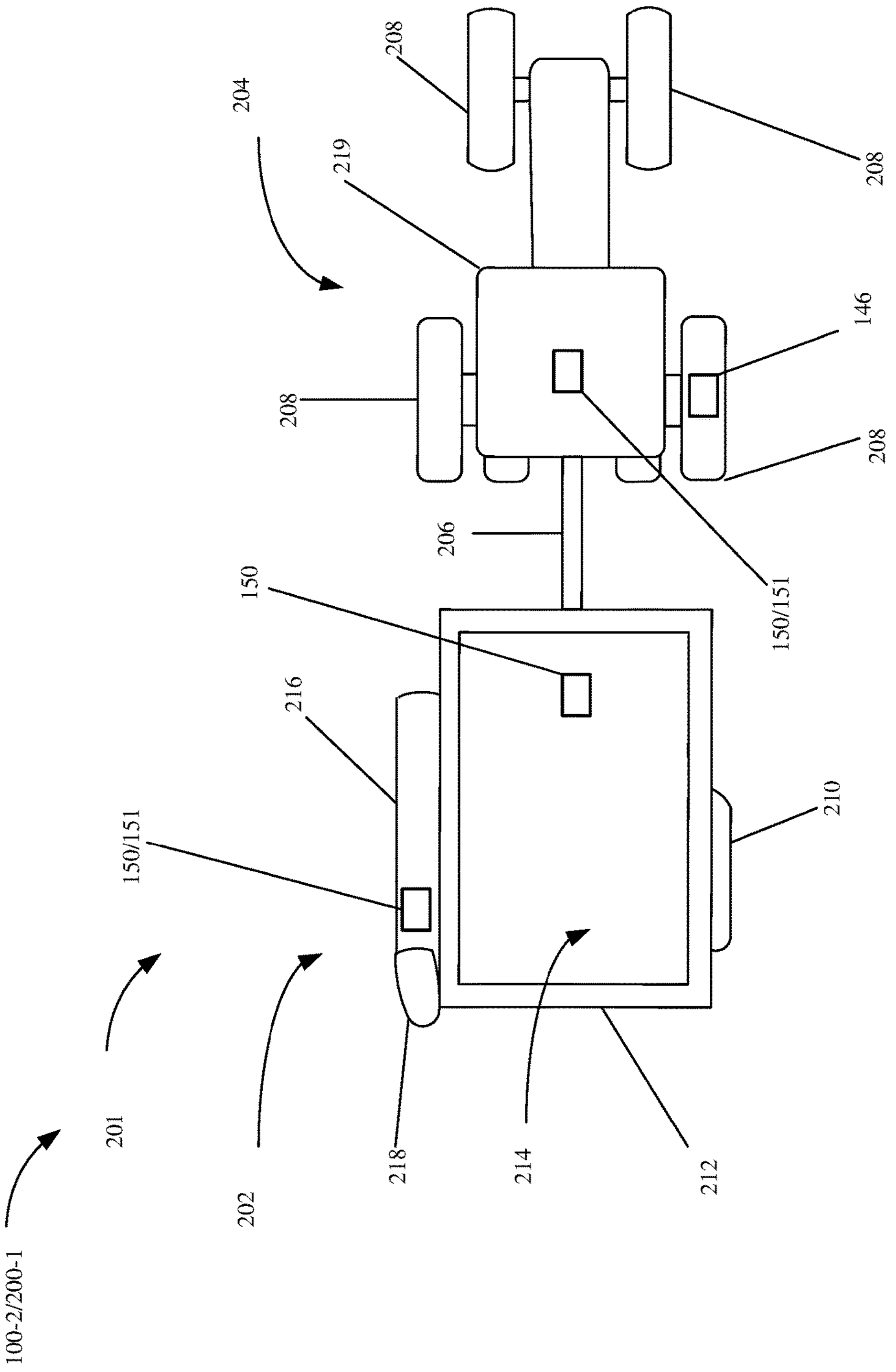
FIG. 2 is a top view of one example material transfer and material receiving machine.

FIG. 2 is a top view of one example of a material transfer machine 100 (illustratively shown as 100-2) and one example of a material receiving machine 200 (illustratively shown as 200-1). In the example of FIG. 2, material transfer machine 100-1 and material receiving machine 200-1 is in the form a towed grain cart 201. As previously discussed, some machines can be both a material transfer machine and a material receiving machine. Towed grain cart 201 includes grain cart 202 and towing machine 204. Grain cart 202 and towing machine 204 (illustratively a tractor) are coupled by way of a linkage 206. Linkage 206 can include mechanical, electrical, hydraulic, and pneumatic connections. Towing machine 204, itself, includes an operator compartment or cab 219, which can include a variety of different operator interface mechanisms (e.g., 318 shown in FIG. 4) for controlling towed grain cart 201 as well as for displaying various information. Towing machine 204 also includes ground engaging traction elements (e.g., wheels or tracks) 208 which can be driven by a propulsion subsystem (e.g., motor or engine and other drivetrain elements) to propel towed grain cart 201 across a worksite (e.g., field).

Grain cart 202, itself, includes ground engaging traction elements (e.g., wheels or tracks) 210 (only one shown in FIG. 2, though it includes two), which are driven by virtue of the linkage to towing machine 204. Grain cart 202 also includes a material receptacle (or material tank) 212 that defines a volume 214 for receiving material. Grain cart 202 also includes a material transfer subsystem that includes a conveying mechanism (not shown), a chute 216, and a spout 218. Conveying mechanism can be a variety of different types of conveying mechanism, such as an auger or blower. The conveying mechanism is in communication with material receptacle 212 (or the volume 214 of material receptacle 212) and is driven (e.g., by an actuator, such as motor or engine) to convey material from material receptacle 212 through chute 216 and spout 218. Chute 216 is rotatable through a range of positions from a storage position (shown in FIG. 2) to a variety of positions away from grain cart 202 to align spout 218 relative to a material receptacle (e.g., towed trailer, etc.) that is configured to receive the material within material receptacle 212. Spout 218, in some examples, is also rotatable to adjust the direction of the material stream exiting spout 218.

Towed grain cart 201 can include a variety of sensors, some of which are illustrated in FIG. 2, such as ground speed sensor 146 and one or more material transfer status sensors 150/interlock condition sensors 152. These sensors were previously discussed and will also be discussed in more detail in FIG. 4. Additionally, while FIG. 2 shows some example positions of material transfer status sensors 150 and interlock condition sensors 152, it will be understood that material transfer status sensors 150 and interlock condition sensors 152 can be positioned (or otherwise disposed) at a variety of other locations on towed grain cart 201. Further, towed grain cart 201 can include various other sensors, some of which will be discussed below.

Figure 3:
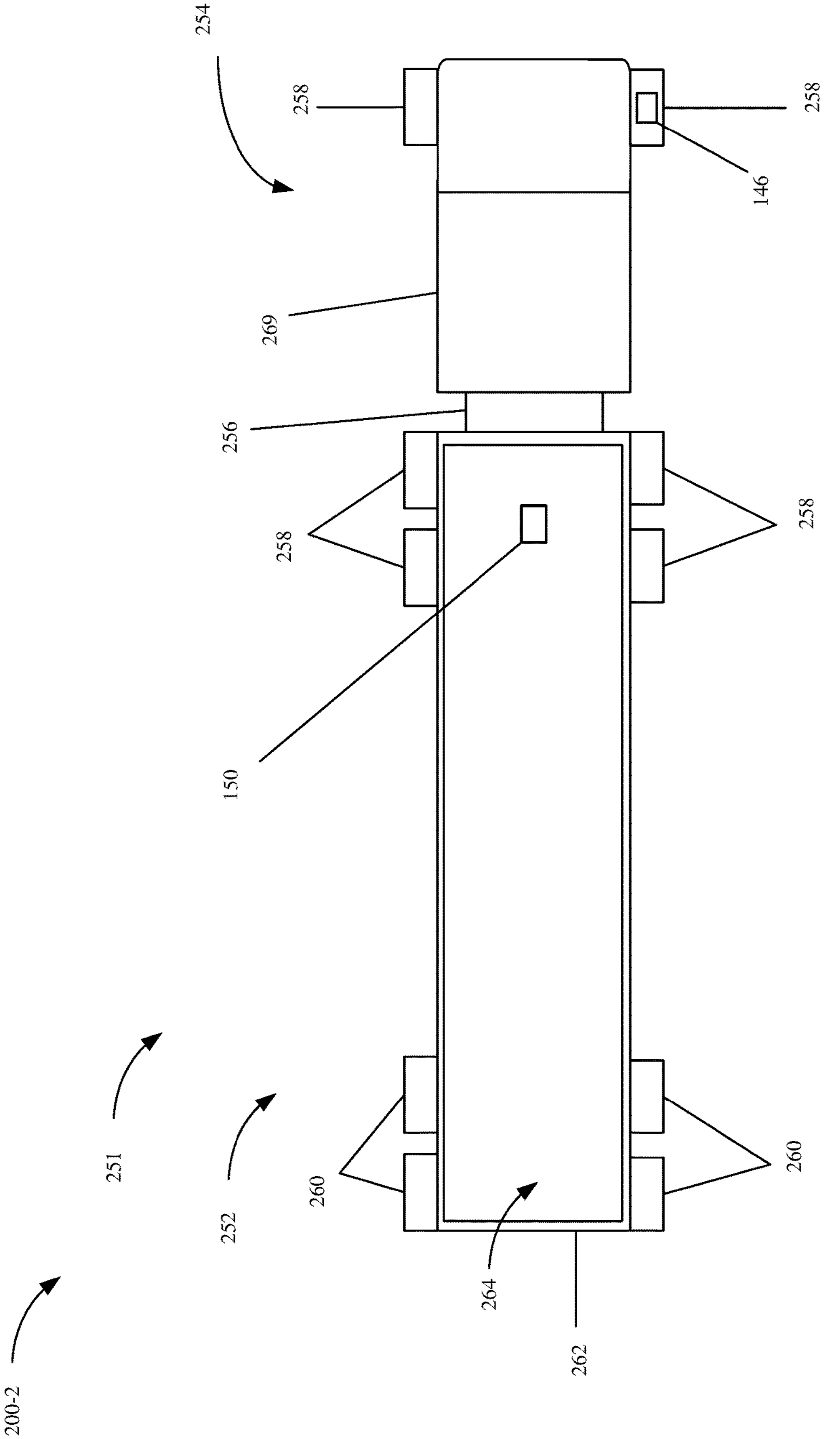
FIG. 3 is a top view of one example material receiving machine.

FIG. 3 is a top view of one example of a material receiving machine 200 (illustratively shown as 200-2). Material receiving machine 200-2 is a grain truck 251. Grain truck 251 includes grain trailer 252 (illustratively a semi-trailer) and towing machine 254 (illustratively a semi-truck or semi-tractor). Grain trailer 252 and towing machine 254 are coupled by way of a linkage 256. Linkage 256 can include mechanical, electrical, hydraulic, and pneumatic connections. Towing machine 254, itself, includes an operator compart or cab 269, which can include a variety of different operator interface mechanisms (e.g., 418 shown in FIG. 4) for controlling grain truck 251 as well as for displaying various information. Towing machine 254 also includes ground engaging traction elements (e.g., wheels) 258 which can be driven by a propulsion subsystem (e.g., motor or engine and other drivetrain elements) to propel grain truck 251 across a worksite (e.g., field).

Grain trailer 252, itself, includes ground engaging traction elements (e.g., wheels) 260, which are driven by virtue of the linkage to towing machine 254. Grain truck 252 also includes a material receptacle (or material tank) 262 that defines a volume 264 for receiving material.

Grain truck 251 can include a variety of sensors, some of which are illustrated in FIG. 3, such as ground speed sensor 146 and one or more material transfer status sensors 150. These sensors were previously discussed and will also be discussed in more detail in FIG. 4. Additionally, while FIG. 3 shows some example positions of material transfer status sensors 150, it will be understood that material transfer status sensors 150 can be positioned (or otherwise disposed) at a variety of the locations on grain truck 251. Further, grain truck 251 can include various other sensors, some of which will be discussed below.

While receiving machines 200 discussed herein are in the form of machines including towing machines and towed material receptacles, it will be understood that in other examples, receiving machines 200 can be self-propelled, that is, the same machine can include both propulsion means and the material receptacle.

Figure 4:
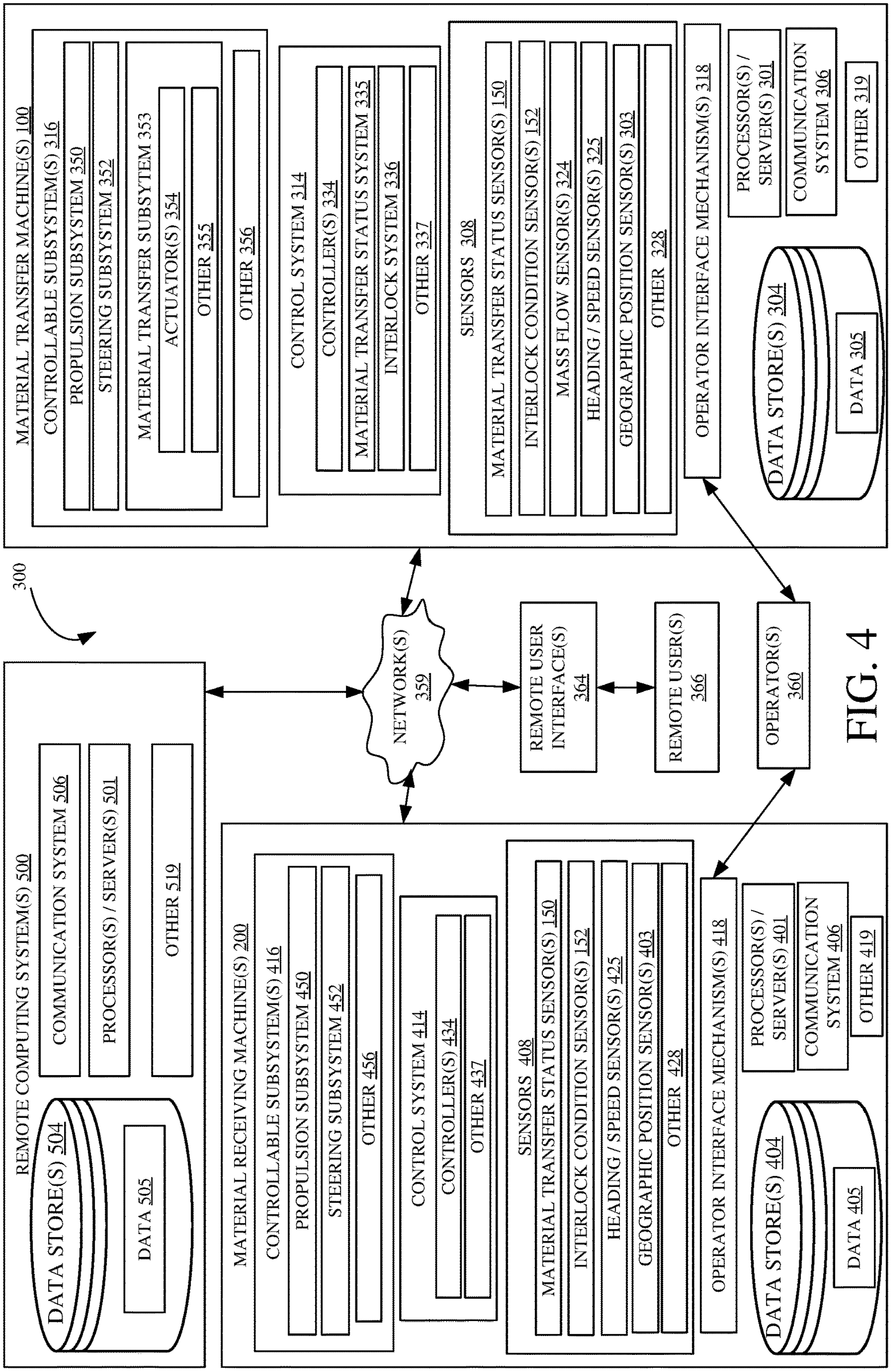
FIG. 4 is a block diagram of one example agricultural system architecture.

FIG. 4 is a block diagram of an agricultural system architecture 300 (also referred to herein as agricultural system 300) in more detail. FIG. 4 shows that agricultural system 300 includes one or more material transfer machines 100, one or more material receiving machines 200, one or more remote computing systems 500, one or more remote user interfaces 364, and one or more networks 359. Material transfer machines 100, themselves, illustratively include one or more processors or servers 301, one or more data stores 304, a communication system 306, one or more sensors 308, a control system 314, one or more controllable subsystems 316, and can include various other items and functionality 319. Material receiving machines 200, themselves, illustratively include one or more processors or servers 401, one or more data stores 404, a communication system 406, one or more sensors 408, a control system 414, one or more controllable subsystems 416, and can include various other items and functionality 419. Remote computing systems 500, themselves, illustratively include one or more processors or servers 501, one or more data stores 504, a communication system 506, and can include various other items and functionality 519.

Data stores 304, 404, and 504 store a variety of data (generally indicated as data 305, data 405, and data 505 respectively), some of which will be described in more detail herein. For example, one or more of data 305, data 405, and data 505, can include, among other things, georeferenced worksite data, such as worksite maps, learned patterns, thresholds, machine data, route data, sensor data generated by sensors (e.g., 308 or 408, or both), as well as a variety of other data. Additionally, data 305 can include computer executable instructions that are executable by one or more processors or servers 301 to implement other items or functionalities of agricultural system 300. Additionally, data 405 can include computer executable instructions that are executable by one or more processors or servers 401 to implement other items or functionalities of agricultural system 300. Additionally, data 505 can include computer executable instructions that are executable by one or more processors or servers 501 to implement other items or functionalities of agricultural system 300. It will be understood that data stores 304, data stores 404, and data stores 505 can include different forms of data stores, for instance one or more of volatile data stores (e.g., Random Access Memory (RAM)) and non-volatile data stores (e.g., Read Only Memory (ROM), hard drives, solid state drives, etc.).

Sensors 308 can include one or more material transfer status sensors 150, one or more interlock condition sensors 152, one or more mass flow sensors 324, one or more heading/speed sensors 325, one or more geographic position sensors 303, and can include various other sensors 328 as well. Sensors 408 can include one or more material transfer status sensors 150, one or more interlock condition sensors 152, one or more heading/speed sensors 425, one or more geographic position sensors 403, and can include various other sensors 428 as well.

Mass flow sensors 324 detect material flow into a material receptacle of the corresponding material transfer machine 100. For instance, where the material transfer machine 100 is a harvester 101, the mass flow sensors 324 detect a mass flow of harvested crop material into the material receptacle (grain tank) 132. The mass flow sensors 324 can comprise one or more impact sensors, positioned in the clean grain elevator 130, that are impacted by crop material (grain) as the crop material is flowing into the grain tank 132. In other examples, the mass flow sensors 324 can be other types of flow sensing devices such as non-contact sensors, for instance, electromagnetic (EM) radiation sensing devices that generate EM radiation that is directed through the crop material flow and receive the EM radiation that flows through or is reflected from the crop material flow. In one example, mass flow sensors 324 are similar to mass flow sensors 147. These are merely some examples.

Heading/speed sensors 325 detect a heading characteristic (e.g., travel direction) or speed characteristics (e.g., travel speed, acceleration, deceleration, etc.), or both, of a corresponding material transfer machine 100. This can include sensors that sense the movement (e.g., rotation) of ground- or movement of components coupled to the ground engaging elements or other elements, or can utilize signals received from other sources, such as geographic position sensors 303. Thus, while heading/speed sensors 325 as described herein are shown as separate from geographic position sensors 303, in some examples, machine heading/speed is derived from signals received from geographic position sensors 303 and subsequent processing. In other examples, heading/speed sensors 325 are separate sensors and do not utilize signals received from other sources. Heading/speed sensors 425 detect a heading characteristic (e.g., travel direction) or speed characteristics (e.g., travel speed, acceleration, deceleration, etc.), or both, of a corresponding material receiving machine 200. This can include sensors that sense the movement (e.g., rotation) of ground-engaging traction elements (e.g., wheels or tracks) or movement of components coupled to the ground engaging elements or other elements, or can utilize signals received from other sources, such as geographic position sensors 403. Thus, while heading/speed sensors 425 as described herein are shown as separate from geographic position sensors 403, in some examples, machine heading/speed is derived from signals received from geographic position sensors 403 and subsequent processing. In other examples, heading/speed sensors 425 are separate sensors and do not utilize signals received from other sources.

Geographic position sensors 303 illustratively sense or detect the geographic position or location of a corresponding material transfer machine 100. Geographic position sensors can include, but are not limited to, a global navigation satellite system (GNSS) receiver that receives signals from a GNSS satellite transmitter. Geographic position sensors 403 can also include a real-time kinematic (RTK) component that is configured to enhance the precision of position data derived from the GNSS signal. Geographic position sensors 303 can include a dead reckoning system, a cellular triangulation system, or any of a variety of other geographic position sensors. Geographic position sensors 403 illustratively sense or detect the geographic position or location of a corresponding material receiving machine 400. Geographic position sensors 403 can include, but are not limited to, a global navigation satellite system (GNSS) receiver that receives signals from a GNSS satellite transmitter. Geographic position sensors 403 can also include a real-time kinematic (RTK) component that is configured to enhance the precision of position data derived from the GNSS signal. Geographic position sensors 403 can include a dead reckoning system, a cellular triangulation system, or any of a variety of other geographic position sensors.

Other sensors 328 can include, for example, but not by limitation, machine orientation sensors, such as inertial measurement units, gyroscopes, accelerometers, etc., that provide sensor data indicative of orientation (e.g., pitch, roll, and yaw) of a material transfer machine 100. Other sensors 428 can include, for example, but not by limitation, machine orientation sensors, such as inertial measurement units, gyroscopes, accelerometers, etc., that provide sensor data indicative of orientation (e.g., pitch, roll, and yaw) of a material receiving machine 200.

Figure 5:
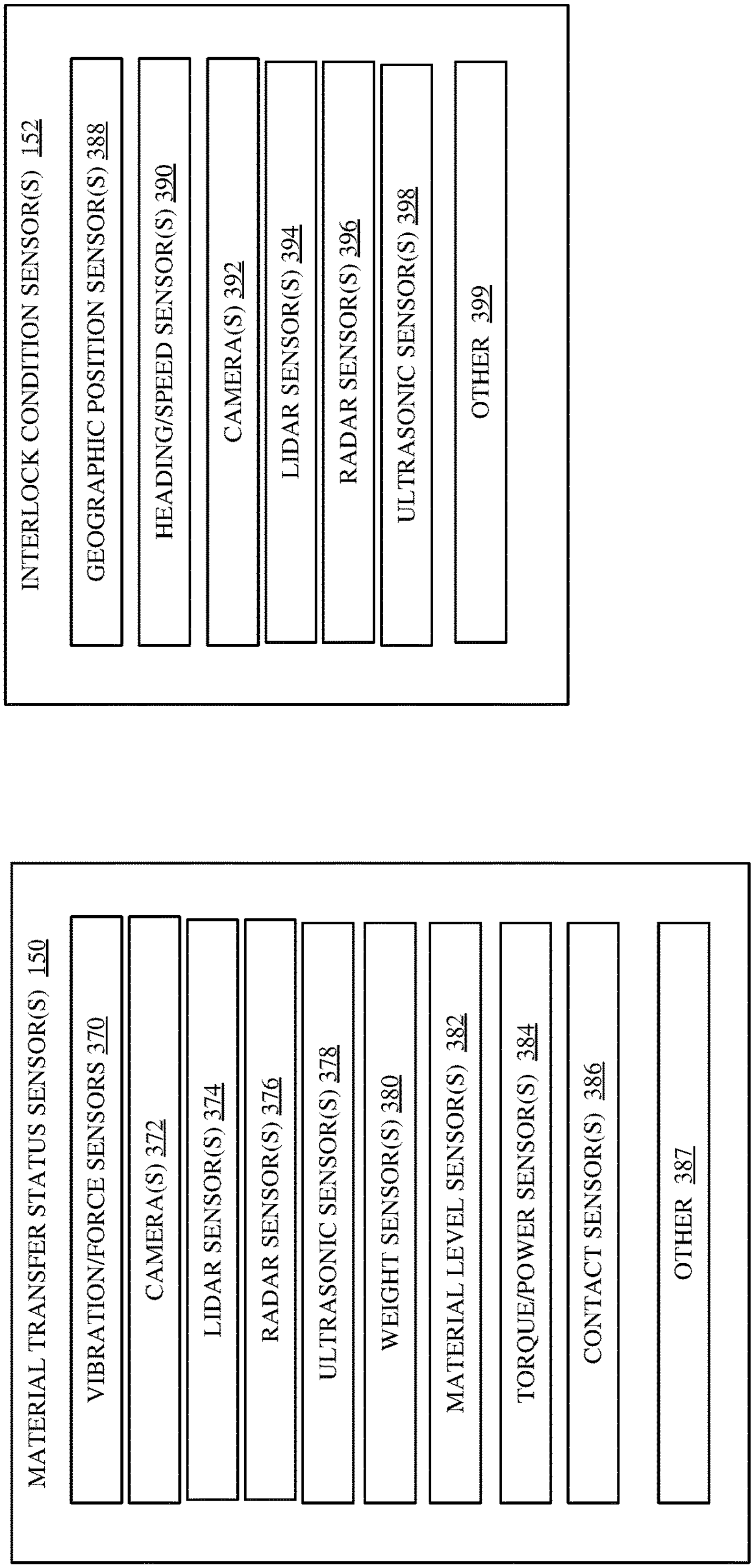
FIG. 5 is a block diagram showing one example of material transfer status sensors and interlock condition sensors.

Conversation will now proceed to FIG. 5 where material transfer status sensors 150 and interlock condition sensors 152 are shown in more detail in FIG. 5. FIG. 5 is a block diagram showing material transfer status sensors 150 and interlock condition sensors 152 in more detail.

As illustrated in FIG. 5, material transfer status sensors 150 can include one or more vibration (or force) sensors 370, one or more cameras 372, one or more lidar sensors 374, one or more radar sensors 376, one or more ultrasonic sensors 378, one or more weight sensors 380, one or more material level sensors 382, one or more torque or power sensors 384, one or more contact sensors 386, and can include various other sensors 387. As illustrated in FIG. 5, interlock condition sensors 152 can include one or more geographic position sensors 388 (e.g., 303 or 403, or both), one or more heading/speed sensors 390 (e.g., 325 or 425, or both), one or more cameras 392, one or more lidar sensors 394, one or more radar sensors 396, one or more ultrasonic sensors 398, and can include various other sensors 399.

Vibration/force sensors 370 illustratively detect a vibration pattern that results from movement of a material transfer subsystem of a material transfer machine 100. As a material transfer subsystem operates to transfer material to a material receptacle, such as a material receptacle of a material receiving machine 200, portions of the material transfer subsystem (e.g., chute 135 or chute 216 or spout 136 or spout 218) will move in multiple directions (e.g., oscillate) due to the movement of material therethrough. The vibration can be detected to indicate the status of the material transfer operation (e.g., whether it is occurring or not occurring and to what extent it is occurring). The vibration/force sensors 370 can generate sensor data indicative of a vibration pattern. The detected vibration pattern can indicate the frequency and intensity (e.g., magnitude) of movement. Vibration/force sensors 370 can be disposed on a material transfer subsystem. Vibration/force sensors 370 can include accelerometers. Vibration/force sensors 370 can include or comprise various other types of sensors, such as displacement sensors (e.g., capacitive displacement sensors, laser displacement sensors, etc.), microphones, strain gauges, as well as various other sensors.

Cameras 372 illustratively capture images indicative of whether material is currently being transferred (e.g., images indicating presence of material at a given location, such as an outlet of the material transfer subsystem (e.g., below the spout), images indicating movement of material through or out of a material transfer subsystem, or images indicting movement of material into a material receptacle of a material receiving machine 200). Cameras 372 can be mono or stereo cameras. Cameras 372 can be placed on a material transfer machine 100 or on a material receiving machine 200, or both. Cameras 392 illustratively capture images indicative of the presence or absence of an interlock condition (e.g., whether or not an object is in a swing zone of a material transfer subsystem of a material transfer subsystem). Cameras 392 can be mono or stereo cameras. Cameras 392 can be on a material transfer machine 100 or on a material receiving machine 200, or both. In some examples, a camera 372 and a camera 392 can be the same camera. That is, a camera that captures images indicative of whether material is currently being transferred can also capture images indicative of the presence or absence of an interlock condition. Thus, while cameras 372 and cameras 392 as described herein are shown separately, in some examples, they may be the same camera.

Lidar sensors 374 illustratively generate and receive electromagnetic (EM) radiation that is reflected from objects. The EM radiation received by lidar sensors 374 is indicative of whether material is currently being transferred. For instance, the EM radiation may be reflected from material that is being transferred and thus, the received EM radiation may indicate the presence of material and thus, that material is being transferred. On the other hand, the received EM radiation may be reflected from another object (e.g., surface of the material transfer subsystem, surface of a receiving machine 200 or surface of a transfer machine 100, surface of a worksite, etc.) and thus, the received EM radiation may indicate the absence of material and thus, that material is not being transferred. Lidar sensors 374 can be on a material transfer machine 100 or a material receiving machine 200, or both. Lidar sensors 394 illustratively generate and receive EM radiation that is reflected from objects in a swing zone of a material transfer subsystem. Thus, the EM radiation received by lidar sensors 394 is indicative of the presence or absence of an interlock condition. For instance, the EM radiation may be reflected from an object in the swing zone and thus, the received EM radiation may indicate the presence of an object in the swing zone and thus, an interlock condition. On the other hand, the EM radiation may be reflected from another object outside of the swing zone and thus, the received EM radiation may indicate the absence of an object in the swing zone and thus, the absence of an interlock condition. Lidar sensors 394 can be on a material transfer machine 100 or on a material receiving machine 200, or both. In some examples, a lidar sensor 374 and a lidar sensor 394 can be the same lidar sensor. That is, a lidar sensor that detects whether material is currently being transferred can also detect the presence or absence of an interlock condition. Thus, while lidar sensors 374 and lidar sensors 394 as described herein are shown separately, in some examples, they may be the same lidar sensor.

Radar sensors 376 illustratively generate and receive radio waves that are reflected from objects. The radio waves received by radar sensors 376 indicate whether material is currently being transferred. For instance, the received radio waves may be reflected from material being transferred and thus, may indicate the presence of material and thus, that material is being transferred. On the other hand, the received radio waves may be reflected from another object (e.g., surface of the material transfer subsystem, surface of a receiving machine 200 or surface of a transfer machine 100, surface of a worksite, etc.) and thus, the received radio waves may indicate the absence of material and thus, that material is not being transferred. Radar sensors 376 can be on a material transfer machine 100 or a material receiving machine 200, or both. Radar sensors 396 illustratively generate and receive radio waves that are reflected from objects in a swing zone of a material transfer subsystem. Thus, the radio waves received by radar sensors 396 are indicative of the presence or absence of an interlock condition. For instance, the radio waves may be reflected from an object in the swing zone and thus, the received radio waves may indicate the presence of an object in the swing zone and thus, an interlock condition. On the other hand, the radio waves may be reflected from another object outside of the swing zone and thus, the received radio waves may indicate the absence of an object in the swing zone and thus, the absence of an interlock condition. Radar sensors 396 can be on a material transfer machine 100 or on a material receiving machine 200, or both. In some examples, a radar sensor 376 and a radar sensor 396 can be the same radar sensor. That is, a radar sensor that detects whether material is currently being transferred can also detect the presence or absence of an interlock condition. Thus, while radar sensors 376 and radar sensors 396 as described herein are shown separately, in some examples, they may be the same radar sensor.

Ultrasonic sensors 378 illustratively generate and receive sound waves that are reflected from objects. The sound waves received by ultrasonic sensors 378 indicate whether material is currently being transferred. For instance, the received sound waves may be reflected from material being transferred and thus, may indicate the presence of material and thus, that material is being transferred. On the other hand, the received sound waves may be reflected from another object (e.g., surface of the material transfer subsystem, surface of a receiving machine 200 or surface of a transfer machine 100, surface of a worksite, etc.) and thus, the received sound waves may indicate the absence of material and thus, that material is not being transferred. Ultrasonic sensors 378 can be on a material transfer machine 100 or a material receiving machine 200, or both. Ultrasonic sensors 398 illustratively generate and receive sound waves that are reflected from objects in a swing zone of a material transfer subsystem. Thus, the sound waves received by ultrasonic sensors 398 are indicative of the presence or absence of an interlock condition. For instance, the sound waves may be reflected from an object in the swing zone and thus, the received sound waves may indicate the presence of an object in the swing zone and thus, an interlock condition. On the other hand, the sound waves may be reflected from another object outside of the swing zone and thus, the received sound waves may indicate the absence of an object in the swing zone and thus, the absence of an interlock condition. Ultrasonic sensors 398 can be on a material transfer machine 100 or on a material receiving machine 200, or both. In some examples, an ultrasonic sensor 378 and an ultrasonic sensor 398 can be the same ultrasonic sensor. That is, an ultrasonic sensor that detects whether material is currently being transferred can also detect the presence or absence of an interlock condition. Thus, while ultrasonic sensors 378 and ultrasonic sensors 398 as described herein are shown separately, in some examples, they may be the same ultrasonic sensor.

Weight sensors 380 illustratively detect a force or pressure to detect a weight of material in an associated material receptacle (e.g., 132, 212, or 262). The material within the material receptacle will exert a force or pressure, due to its weight, which can be detected by weight sensors 380. Weight sensors 380 can be on a material transfer machine 100 or a material receiving machine 200, or both. In some examples, the weight sensors 380 can be placed directly in the material receptacle or can be placed between the material receptable and a frame that the material receptacle is coupled to or between another object (e.g., axle) and a frame that the axle is coupled to. These are merely some examples of the locations at which weight sensors 380 may be placed. Weight sensors 380 can include strain gauges, load cells, as well as various other types of sensors. The weight sensors 380 generate sensor data indicative of the weight of material in a corresponding material receptacle and that weight can be tracked over time to indicate whether or not material is being transferred. For instance, weight sensors 380 may detect a change (e.g., an increase) in weight of material in a material receptacle of a material receiving machine 200 and thus, that material is being transferred. In another example, weight sensors 380 may detect a change (e.g., a decrease) in weight of material in a material receptacle of a material transfer machine 100 and thus, that material is being transferred. In addition to tracking the weight over time to detect an increase or decrease, the rate of the increase or decrease can also be detected.

Material level sensors 382 illustratively detect a level of material in a corresponding material receptacle. The level of material in a material receptacle will change as material is subtracted or added and thus, the detected level can indicate whether material is being transferred or not. Material level sensors 382 can be on a material transfer machine 100 or a material receiving machine 200, or both. Material level sensor 382 can generate sensor data indicative of the level of material in a corresponding material receptacle and that level can be tracked over time to indicate whether or not material being transferred. For instance, material level sensors 382 may detect a change (e.g., an increase) in the level of material in a material receptacle of a material receiving machine 200 and thus, that material is being transferred. In another example, material level sensors 382 may detect a change (e.g., a decrease) in the level of material in a material receptacle of a material transfer machine 100 and thus, that material is being transferred. Material level sensors can include one or more cameras, lidar sensors, radar sensors, ultrasonic sensors, other electromagnetic radiation sensors, as well as contact sensors (e.g., switches, deflectors, etc.) that contact the material and generate sensor data indicative of the contact, as well as various other sensors.

Torque (or power) sensors 384 illustratively detect a force exerted by an actuator (e.g., 354) used to drive the conveying mechanism of material transfer subsystem. For example, the force exerted by an actuator used to drive the conveying mechanism can indicate whether or not material is being transferred. For instance, detected force can indicate that the actuator (and thus the material transfer subsystem) is operating, however, the force may need to exceed a threshold to indicate that material is being transferred (i.e., more force is needed to convey material than to just operate the subsystem). Torque (or power) sensors 384 can include torque transducers, voltage sensors, current sensors, fluid pressure sensors, as well as various other sensors. Torque (or power) sensors 384 can be on a material transfer machine 100.

Contact sensors 386 illustratively detect contact with material and generate sensor data indicative of the contact. Contact sensors 386 can include sensors or deflectors that generate, as sensor data, electrical signals in response to contact, such as contact with material being transferred. Contact sensors 387 can be placed at various locations, such as within a corresponding material transfer subsystem (e.g., within a chute or a spout) or at the exit of a material transfer subsystem (e.g., at the exit of spout) such that they will be contacted by material when material is being transferred.

Material transfer status sensors 150 can include various other sensors 387, for instance, EM radiation sensors that generate EM radiation that is directed through a flow of material and receive the EM radiation that passes through or is reflected from the flow of material. Interlock condition sensors 152 can include various other sensors 399.

Conversation Now Returns to FIG. 4.

Controllable subsystems 316 can include a propulsion subsystem 350, a steering subsystem 352, a material transfer subsystem 353, as well as various other controllable subsystems 356. Material transfer subsystem 353, itself, includes one or more material transfer subsystem actuators 354, and can include various other items 355. Controllable subsystems 416 include propulsion subsystem 450, steering subsystem 452, and can include various other controllable subsystems 456.

Propulsion subsystem 350 illustratively propels material transfer machine 100 across a worksite by driving ground engaging traction elements (e.g., wheels or tracks). Propulsion subsystem 350 can include one or more actuators (e.g., engine, motors, fluid pumps, etc.) to actuate various drive train elements (e.g., transmission, rotatable shafts, axles, etc.) to drive the ground engaging traction elements. Propulsion subsystem 350 is controllable to vary the speed of material transfer machine 100 and the direction in which the material transfer machine 100 is being driven (e.g., forward or reverse). Propulsion subsystem 450 illustratively propels material receiving machine 200 across a worksite by driving ground engaging traction elements. Propulsion subsystem 450 can include one or more actuators (e.g., engine, motors, fluid pumps, etc.) to actuate various drive train elements (e.g., transmission, rotatable shafts, axles, etc.) to drive the ground engaging traction elements. Propulsion subsystem 450 is controllable to vary the speed of material receiving machine 200 and the direction in which the material receiving machine 200 is being driven (e.g., forward or reverse).

Steering subsystem 350 illustratively controls the direction of travel (steering or heading) of material transfer machine 100. Steering subsystem 350 can include one or more actuators (e.g., electric or hydraulic actuators) that actuate to change an orientation (e.g., steering angle) of one or more ground engaging traction elements. Thus, steering subsystem is controllable to vary the direction of travel (heading or steering) of material transfer machine 100. Steering subsystem 450 illustratively controls the direction of travel (steering or heading) of material receiving machine 200. Steering subsystem 450 can include one or more actuators (e.g., electric or hydraulic actuators) that actuate to change an orientation (e.g., steering angle) of one or more ground engaging traction elements. Thus, steering subsystem is controllable to vary the direction of travel (heading or steering) of material receiving machine 200.

Material transfer subsystem actuators 354 include actuators (e.g., hydraulic, electric, pneumatic, etc.) to actuate a material transfer subsystem between a stored position and a variety of deployed positions (e.g., to cause extension and retraction of the material transfer subsystem) as well as actuators (e.g., motor, engine, pump, etc.) used to drive the conveying mechanism (e.g., auger, blower, etc.) of material transfer subsystem. Thus, material transfer subsystem actuators 354 include actuators that are controllable to actuate (extend and retract) material transfer subsystem and actuators that are controllable to actuate (drive) the conveying mechanism of the material transfer subsystem. Other items 355 include conveying mechanisms (e.g., auger, blower, etc.), chutes (e.g., 135, 216, etc.), spouts (e.g., 136, 218, etc.), as well as various other items.

Control system 314 can include one or more controllers 334, material transfer status system 335, interlock system 336, and can include various other items. Controllers 334 illustratively generate control signals to control controllable subsystems 316 as well as other items of agricultural system 300 (e.g., operator interface mechanisms 318 or user interface mechanisms 364). In one example, each subsystem 316 can have a dedicated controller 334 (e.g., a propulsion subsystem controller, a steering subsystem controller, a material transfer subsystem actuator controller, other subsystem controllers). In another example, a central controller 334 can control a plurality of the controllable subsystems 316. Controllers 334 can generate control signals based on various data, including sensor data generated by sensors 308 or sensors 408 or based on outputs from material transfer status system 335 or outputs from interlock system 336. Material transfer status system 335 generally determines a status of material transfer (e.g., whether or not material transfer is occurring, and to what extent material transfer is occurring). Material transfer status system 335 will be discussed in more detail in FIG. 6. Interlock system 336 generally determines the presence or absence of an interlock condition (e.g., whether or not an object is in the swing zone of a material transfer subsystem). Interlock system 336 will be discussed in more detail in FIG. 7.

Control system 414 can include one or more controllers 434 and can include various other items. Controllers 434 illustratively generate control signals to control controllable subsystems 416 as well as other items of agricultural system 300 (e.g., operator interface mechanisms 418 or user interface mechanisms 364). In one example, each subsystem 416 can have a dedicated controller 434 (e.g., a propulsion subsystem controller, a steering subsystem controller, other subsystem controllers). In another example, a central controller 434 can control a plurality of the controllable subsystems 416. Controllers 334 can generate control signals based on various data, including sensor data generated by sensors 308 or sensors 408 or based on outputs from material transfer status system 335 or outputs from interlock system 336.

Communication system 306 is used to communicate between components of a material transfer machine 100 or with other items of agricultural system 300, such as other material transfer machines 100, remote computing systems 500, and material receiving machines 200. Communication system 406 is used to communicate between components of a material receiving machine 200 or with other items of agricultural system 300, such as other material receiving machines 200, remote computing systems 500, and material transfer machines 100. Communication system 506 is used to communicate between components of a remote computing system 500 or with other items of agricultural system 300, such as other remote computing systems 500, material transfer machines 100, and material receiving machines 200.

Communication systems 306, 406, 506 can each include one or more of wired communication circuitry and wireless communication circuitry, as well as wired and wireless communication components. In some examples, communication systems 306, 406, and 506 can each be a cellular communication system, a system for communicating over a wide area network or a local area network, a system for communicating over a controller area network (CAN), such as a CAN bus, a system for communication over a near field communication network, or a communication system configured to communicate over any of a variety of other networks. Communication systems 306, 406, and 506 can each also include a system that facilitates downloads or transfers of information to and from a secure digital (SD) card or a universal serial bus (USB) card, or both. Communication systems 306, 406, and 506 can each utilize network 359. Networks 359 can be any of a wide variety of different types of networks such as the Internet, a cellular network, a wide area network (WAN), a local area network (LAN), a controller area network (CAN), a near-field communication network, or any of a wide variety of other networks or communication systems.

FIG. 4 also shows remote users 366 interacting with material transfer machines 100, material receiving machines 200, and remote computing systems 500 through user interfaces mechanisms 364 over networks 359. In some examples, user interface mechanisms 364 may include joysticks, levers, a steering wheel, linkages, pedals, buttons, wireless devices (e.g., mobile computing devices, etc.), dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, the users 366 may interact with user interface mechanisms 364 using touch gestures. These examples described above are provided as illustrative examples and are not intended to limit the scope of the present disclosure. Consequently, other types of user interface mechanisms 364 may be used and are within the scope of the present disclosure.

FIG. 4 also shows that one or more operators 360 may operate material transfer machines 100 and material receiving machines 200. Operators 360 that operate a material transfer machine 100 interact with operator interface mechanisms 318. Operators that operate a material receiving machine 200 interact with operator interface mechanisms 418. In some examples, operator interface mechanisms 318 and 418 may include joysticks, levers, a steering wheel, linkages, pedals, buttons, wireless devices (e.g., mobile computing devices, etc.), dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, the operators 360 may interact with operator interface mechanisms 318 and 418 using touch gestures. These examples described above are provided as illustrative examples and are not intended to limit the scope of the present disclosure. Consequently, other types of operator interface mechanisms 318 and 418 may be used and are within the scope of the present disclosure.

Remote computing systems 500 can be a wide variety of different types of systems, or combinations thereof. For example, remote computing systems 500 can be in a remote server environment. Further, remote computing systems 500 can be remote computing systems, such as mobile devices, a remote network, a farm manager system, a vendor system, or a wide variety of other remote systems.

While the example shown in FIG. 4 illustrates items being distributed across agricultural system 300 in a particular way, in other examples, one or more of the items shown in FIG. 4 can be, alternatively or additionally, located elsewhere. For example, material transfer status system 335 can, alternatively or additionally, be located on material receiving machines 200 or remote computing systems 500, or both. Similarly, interlock system 336 can, alternatively or additionally, be located on material receiving machines 200 or remote computing systems 500, or both. Thus, it will be understood that the items in agricultural system 300 can be distributed in various ways, including ways that differ from the example shown in FIG. 4.

Figure 6:
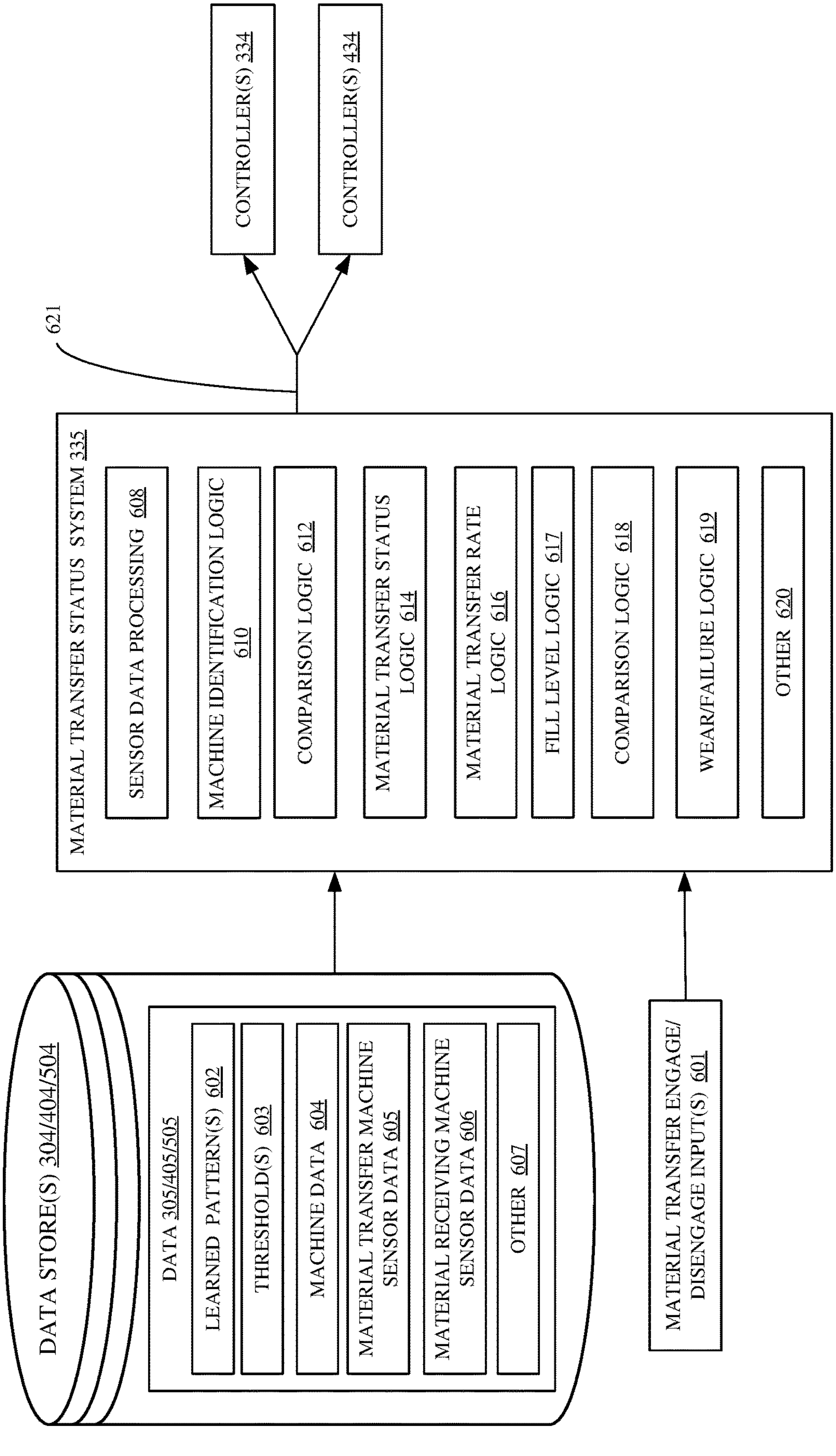
FIG. 6 is a block diagram showing one example of a material transfer status system.

FIG. 6 is a block diagram of portions of agricultural system 300, including material transfer status system 335, shown in FIG. 4, in more detail. FIG. 6 also shows the information flow among the various components shown. As illustrated, material transfer status system 335 obtains (e.g., retrieves or receives) one or more of data 305, 405, and 505, material transfer engage/disengage inputs 601, and generates one or more material transfer status outputs 621 based thereon. The one or more material transfer status outputs 621 are obtained by controllers 334 or controllers 434, or both, and can be used to control various items of agricultural system 300.

Data 305, 405, and 505, can include one or more learned patterns 602, one or more thresholds 603, machine data 604, material transfer machine sensor data 605, material receiving machine sensor data 606, and can include various other data 607.

Learned patterns 602 include sensor data (e.g., sensor signal patterns) that are learned (e.g., calibrated) and correspond to various material transfer statuses. The learned patterns 602 can be learned through machine learning or other calibration techniques. The learned patterns 602 can be sensor specific and machine specific (e.g., correlated to a particular machine identification (ID)). For example, for each machine and for each type of sensor, there may be a learned pattern indicating sensor data indicative of material transfer occurring and a learned pattern indicating sensor data indicative of material transfer being completed. One example of learned patterns 602 are learned vibration patterns indicative of learned sensor data from vibration sensors 370 that indicate when material transfer is occurring and when material transfer is completed.

Thresholds 603 can include set or desired levels (or values) useable by material transfer status system 335 to determine the status of a material transfer operation (e.g., whether material transfer is still occurring or whether material transfer is completed). For example, thresholds 603 may be levels (or values) that are used to determine whether the material transfer operation is still occurring or whether the material transfer operation is complete. Thus, the levels (or values) extracted from sensor data can be used, along with the thresholds 603, to determine whether the material transfer operation is still occurring or whether the material transfer operation is complete. For example, levels (or values) extracted from sensor data can be compared to threshold levels (or values) to determine whether the material transfer operation is still occurring or whether the material transfer operation is complete. In one example, whether the material transfer operation is complete may not be when material is no longer being transferred, but rather, may be complete when material is transferring at or less than a given level (or value) or when a threshold amount of material has been transferred, or when the weight or level of material in a material receptacle is at a desired level. Thus, complete may mean complete at least to a threshold level.

Machine data 604 includes various data corresponding to the various machines (e.g., 100 and 200) of agricultural system 300. This includes machine dimension data (e.g., indicative of lengths, widths, and heights of the machines in various states, such as material transfer subsystem extension and retraction states), machine capacity data (e.g., capacity of material receptacles), machine rating data (e.g., unload rates of material transfer subsystems), machine identifications (e.g., unique identifications (IDs) for each machine), as well as various other data.

Material transfer machine sensor data 605 includes sensor data generated by sensors 308 which can include material transfer status sensor data generated by material transfer status sensors 150 of material transfer machines 100, interlock condition sensor data generated by interlock condition sensors 152, mass flow sensor data generated by mass flow sensors 324, heading sensor data generated by heading/speed sensors 325, speed sensor data generated by heading/speed sensors 325, geographic position sensor data generated by geographic position sensors 303, as well as various other sensor data generated by other sensors 328, such as, but not limited to, machine orientation sensor data. Material receiving machine sensor data 606 includes sensor data generated by sensors 408 which can include material transfer status sensor data generated by material transfer status sensors 150 or material receiving machines 200, heading sensor data generated by heading/speed sensors 425, speed sensor data generated by heading/speed sensors 425, geographic position sensor data generated by geographic position sensors 403, as well as various other sensor data generated by other sensors 428.

Material transfer status sensor data can include vibration (or force) sensor data generated by vibration/force sensors 370, camera sensor data generated by cameras 372, lidar sensor data generated by lidar sensors 374, radar sensor data generated by radar sensors 376, ultrasonic sensor data generated by ultrasonic sensors 378, weight sensor data generated by weight sensors 380, material level sensor data generated by material level sensors 382, torque sensor data generated by torque/power sensors 384, power sensor data generated by torque/power sensors 384, contact sensor data generated by contact sensors 386, as well as other material transfer status sensor data generated by other material transfer status sensors 387. Interlock condition sensor data can include geographic position sensor data generated by geographic position sensors 388, heading sensor data generated by heading/speed sensors 390, speed sensor data generated by heading/speed sensors 390, camera sensor data generated by cameras 392, lidar sensor data generated by lidar sensors 394, radar sensor data generated by radar sensors 396, ultrasonic sensor data generated by ultrasonic sensors 398, as well as various other interlock condition sensor data generated other interlock condition sensors 399.

Data stores 305, 405, and 505 can include various other data 607 some examples of which have been previously discussed.

Material transfer engage and disengage inputs 601 are indicative of commanded settings of a material transfer subsystem of a material transfer machine 100, such as commanded engagement and disengagement of a material transfer subsystem 353, commanded position (extension and retraction position), and commanded power or speed settings. In some examples, the material transfer engage and disengage inputs 601 are input by an operator 360 through an operator interface mechanism 318. In some examples, the material transfer engage and disengage inputs 601 are an output of control system 314, in the form of control signals. The material transfer engage and disengage inputs 601 can be timestamped.

As illustrated in FIG. 6, material transfer status system 335 includes sensor data processing 608, machine identification logic 610, comparison logic 612, material transfer status logic 614, material transfer rate logic 616, fill level logic 617, comparison logic 618, wear/failure logic, and can include various other items 620 as well.

Sensor data processing 608 illustratively processes sensor data 604 and 605 to extract levels (or values) or patterns. For example, sensor data processing 608 can process sensor data generated by heading/speed sensors 325 or heading/speed sensors 425, or both, to extract levels (or values) indicative of machine speed or machine heading, or both. Sensor data processing 608 can process sensor data generated by geographic position sensors 303 or geographic position sensors 403, or both, to extract levels (or values) indicative of machine position or location. Sensor data processing 608 can process sensor data generated by mass flow sensors 324 to extract levels (or values) indicative of mass flow. Sensor data processing 608 can process sensor data generated by material transfer status sensors 150 to extract levels (or values) or patterns (material transfer status levels (or values) or patterns) indicative of a material transfer status (e.g., whether material transfer is occurring or whether material transfer is complete, material transfer rate, fill level, etc.). Material transfer status levels (or values) or patterns can include levels (or values) or patterns indicative of whether material is being transferred, how much material is being transferred, as well as an amount of material that has been transferred.

Sensor data processing 608 can include or utilize various image processing functionalities such as sequential image comparison, color extraction (e.g., RGB color extraction, etc.), edge detection, black/white analysis, pixel testing, pixel clustering, shape detection, as well as any number of other suitable image processing functionalities. Additionally, sensor data processing 608 can include or utilize various machine learning functionalities or various artificial intelligence functionalities, or both. Additionally, sensor data processing 608 can include or utilize various other sensor data processing functionalities such as filtering, noise reduction, categorization, normalization, and aggregation.

Machine identification logic 610 identifies a particular machine, such as a particular material transfer machine 100 or a particular material receiving machine 200, under analysis by material transfer status system 335 based on machine identification (machine ID) data in machine data 604.

Comparison logic 612 compares sensor data or levels (or values) or patterns extracted from sensor data to other items such as corresponding learned patterns 602 or corresponding level (or value) thresholds 603. For example, comparison logic 612 can compare vibration sensor data generated by vibration sensors 370 to a learned vibration pattern. Comparison logic 612 can compare a material transfer status level (or value) to a corresponding material transfer status level (or value) threshold. For example, comparison logic 612 can compare a material transfer status level (or value), in the form of a weight level (or weight value) extracted from weight sensors 380 to a threshold weight level (or weight value). In another example, comparison logic 612 can compare a material transfer status level (or value), in the form of a material level level (or a material level value) extracted from material level sensors 382 to a threshold material level (or material value). In another example, comparison logic 612 can compare a material transfer status level (or value), in the form of a torque level (or torque value) extracted from torque/power sensors 384 to a threshold torque level (or torque value). In another example, comparison logic 612 can compare a material transfer status level (or value), in the form of a material flow level (or material flow value) extracted from one or more of cameras 372, lidar sensors 374, radar sensors 376, ultrasonic sensors 378, weight sensors 380, and contact sensors 386, to a threshold material flow level (or material flow value). Comparison logic 612 can also compare a fill level (or fill level value) generated by fill level logic 617 to a reference fill level or reference fill level value (e.g., threshold fill level or threshold fill level value). These are merely some examples.

Material transfer status logic 614 determines whether material transfer is occurring and whether the material transfer operation is complete based on sensor data 605 or 606, or both, or based on levels (or values) extracted from sensor data 605 or 606, or both, or based on comparisons by comparison logic 612. For instance, in some examples, material may simply not be flowing, in which case, material transfer status logic 614 can determine that a material transfer operation is not occurring or is complete. In other examples, material may be flowing but material transfer status logic 614 may determine that the material transfer operation is complete based on a comparison by comparison logic 612, for instance, a weight threshold may have been met, a material level threshold may have been met, or a material flow threshold may have been met. Material transfer status logic 614 can also determine whether a material transfer operation should be initiated based on a fill level generated by fill level logic 617, for instance, based on a comparison (executed by comparison logic 612) of a current fill level generated by fill level logic 617 to a reference fill level. For instance, once a current fill level is at or exceeds a reference fill level, material transfer status logic 614 can determine that a material transfer operation should be initiated.

Material transfer rate logic 616 determines a rate (e.g., bushels per second, kilograms per second, etc.) at which material is being transferred by a material transfer subsystem 353 of a material transfer machine 100. In one example, material transfer rate logic 616 tracks a change in weight of material in a material receiving machine 200, such as indicated by one or more weight sensors 380, over a period of time to determine the rate at which material is being transferred. In one example, material transfer rate logic 616 tracks a change in weight of material in a material transfer machine 100, such as indicated by one or more weight sensors 380, over a period of time to determine the rate at which material is being transferred. In some examples, material transfer rate logic begins and ends tracking weight change based on material transfer engage and disengage inputs 601.

Fill level logic 617 determines a fill level of a material receptacle of a material transfer machine 100. Fill level logic 617 can track (e.g., aggregate) mass flow levels generated by mass flow sensors 324 over time to indicate an amount of material provided to the material receptacle to determine an amount of material provided to the material receptacle and thus, to determine a fill level of the material receptacle. Additionally, fill level logic can utilize material transfer rate values (or levels) determined by material transfer rate logic 616 to determine an amount of material taken from the material receptacle and thus, to determine a fill level of the material receptacle. Further, fill level logic 617 can utilize material transfer rate values (or levels) determined by material transfer rate logic 616 to determine an amount of material left in the material transfer subsystem 353 after the termination of a material transfer operation which can be utilized in determining the fill level of the material receptacle of the material transfer machine 100. Fill level logic 617 can utilize sensor data from various other sensors, such as cameras 372 (e.g., cameras observing the material receptacle), lidar sensors 374 (e.g., lidar sensors observing the material receptacle), radar sensors 376 (e.g., radar sensors observing the material receptacle), ultrasonic sensors 378 (e.g., ultrasonic sensors observing the material receptacle), or contact sensors 386 (e.g., contact sensors disposed in the material receptacle). Thus, fill level logic 617 can determine whether a material receptacle is full, whether a material receptacle is empty, and to what extent a material receptacle has been filled or emptied. Fill level logic 617 can, in determining the fill level, account for the dimensions (e.g., volume, height, width, length, etc.) of the material receptacle of the material transfer machine 100, as indicated by machine date 604. It will be understood that the fill level can be determined and updated continuously throughout an operation.

Comparison logic 618, in one example, compares material transfer rate values (or levels) determined by material transfer rate logic 616 to a reference value. The reference value can be a mass flow values (or levels) indicated by sensor data generated by mass flow sensors 324. The reference value can be a threshold material transfer rate value (or level).

Material transfer status logic 614 can determine whether material transfer is occurring or is complete based on material transfer rate values (or levels) determined by material transfer rate logic 616 and mass flow values (or levels) indicated by sensor data generated by mass flow sensors 324 or based on comparisons by comparison logic 618. For instance, when the mass flow rate value (or level) is greater (or greater by at least a threshold amount) than the mass flow value (or level) material transfer status logic 614 may determine that material transfer is occurring or is at least not complete. On the other hand, when the mass flow rate value (or level) is less (or less by at least a threshold amount) than the mass flow value (or level) material transfer status logic 614 may determine that material transfer is complete. In another example, when the mass flow rate value (or level) satisfies (e.g., is at or is greater than) a reference value (e.g., threshold material transfer rate value (or level)) material transfer status logic 614 may determine that material transfer is occurring or is at least not complete. On the other hand, when the mass flow rate value (or level) is does not satisfy (e.g., is at or less than) a reference value (e.g., threshold material transfer rate value (or level)) material transfer status logic 614 may determine that material transfer is complete.

In one example, fill level logic 617 can determine that the material receptacle of a material transfer machine 100 is empty (or has been emptied) based on comparison by comparison logic 618. For instance, when the material transfer rate value (or level) is at or less (or less by at least a threshold amount) than the reference value, such as a mass flow value (or level) or another reference value, such as a threshold value, fill level logic 617 may determine that the material receptacle of the material transfer machine 100 is empty (or has been emptied) at least at the time when the material transfer rate value (or level) meets (e.g., is at or is less than or is less than by at least a threshold amount) a reference value, such as a mass flow value or another reference value.

Wear and failure logic 619 can determine wear and failure of a material transfer subsystem 353 (e.g., wear and failure of one or more actuators 354 or wear and failure of one or more other items 355, such as a conveying mechanism) based on material transfer rates determined by material transfer rate logic 616. For example, material transfer rate logic 616 can determine a material transfer rate of a material transfer subsystem 353 at multiple periods throughout a material transfer operation. Wear and failure logic 619 can identify, based on output(s) of material transfer rate logic 616, an amount of time it takes for the material transfer subsystem 353 to ramp up to a reference material transfer rate value, such as a peak material transfer rate value (e.g., a peak material transfer rate value during the transfer operation), a threshold material transfer rate value, or a rated material transfer rate value (e.g., rated at the current settings of the subsystem), or another type of reference material transfer rate value. Wear and failure logic 619 determine wear or failure based on the identified ramp up time. Wear and failure logic 619 can compare a current ramp up time to a reference ramp up time, such as a previous ramp up times (previous ramp up times in the same operation or in previous operations), a rated ramp up time (e.g., from manufacturer or vendor, etc.), or a threshold ramp up time to determine wear and failure. Additionally, where the material transfer rate 616 indicated by material transfer logic 616 is less than a reference transfer rate, such as a historical transfer rate (from the same or a different operation), a rated transfer rate (e.g., from manufacturer or vendor, etc.), or a threshold transfer rate, for the given setting of the material transfer subsystem, wear and failure logic 619 can identify wear or failure. Controllers 334 or controllers 434 can control interface mechanisms to provide an indication indicative of identified wear or failure.

As can be seen, material transfer status system 335 is operable to generate material transfer status outputs 620. Material transfer status outputs 621 can include one or more of whether material is being transferred, as determined by material transfer status logic 614, whether a material transfer operation is complete, as determined by material transfer status logic 614, whether a material transfer operation should be initiated, as determined by material transfer status logic 614, a material transfer rate, as determined by material transfer rate logic 616, fill level, as determined by fill level logic 617, and material transfer subsystem wear or failure, as determined by wear and failure logic 619.

Material transfer status outputs 621 can be obtained (e.g., received or retrieved) by controllers 334 or controllers 434.

Controllers 334 can generate control signals to control one or more items of agricultural system 300 including one or more controllable subsystems 316 based on the material transfer status outputs 621. For example, controllers 334 can control material transfer subsystem actuators 354 to disengage the material transfer subsystem (e.g., to end material transfer by shutting down the conveyance mechanism) and, in some examples, to actuate the material transfer subsystem 353 back to a storage position based on a material transfer status output 621, such as a material transfer status output 621 indicating that a material transfer operation has been completed. In another example, controllers 334 can control material transfer subsystem actuators 354 to actuate material transfer subsystem 353 to a deployed position (e.g., from a storage position) or to engage the material transfer subsystem (e.g., to initiate material transfer by starting up the conveyance mechanism), or both. In another example, controllers 334 can control one or more interfaces (e.g., 318 or 364, or both) to provide an indication (e.g., display, audible output, haptic output, etc.) indicative of the status of one or more of a material transfer operation (e.g., complete, not yet complete, occurring, not occurring), that a material transfer operation should be initiated, the fill level of a material receptacle, a material transfer rate, or wear or failure of the material transfer subsystem, based on a material transfer status output 621.

Controllers 434 can generate control signals to control one or more items of agricultural system 300 including one or more controllable subsystems 416 based on material transfer status outputs 621. For example, controllers 434 can control one or more interfaces (e.g., 418 or 364, or both) to provide an indication (e.g., display, audible output, haptic output, etc.) indicating a status of a material transfer operation (e.g., complete, not yet complete, occurring, not occurring), indicating that a material transfer operation should be initiated, indicating the fill level of a material receptacle, indicating a material transfer rate, or indicating wear or failure of the material transfer subsystem, based on a material transfer status output 621.

Figure 7:
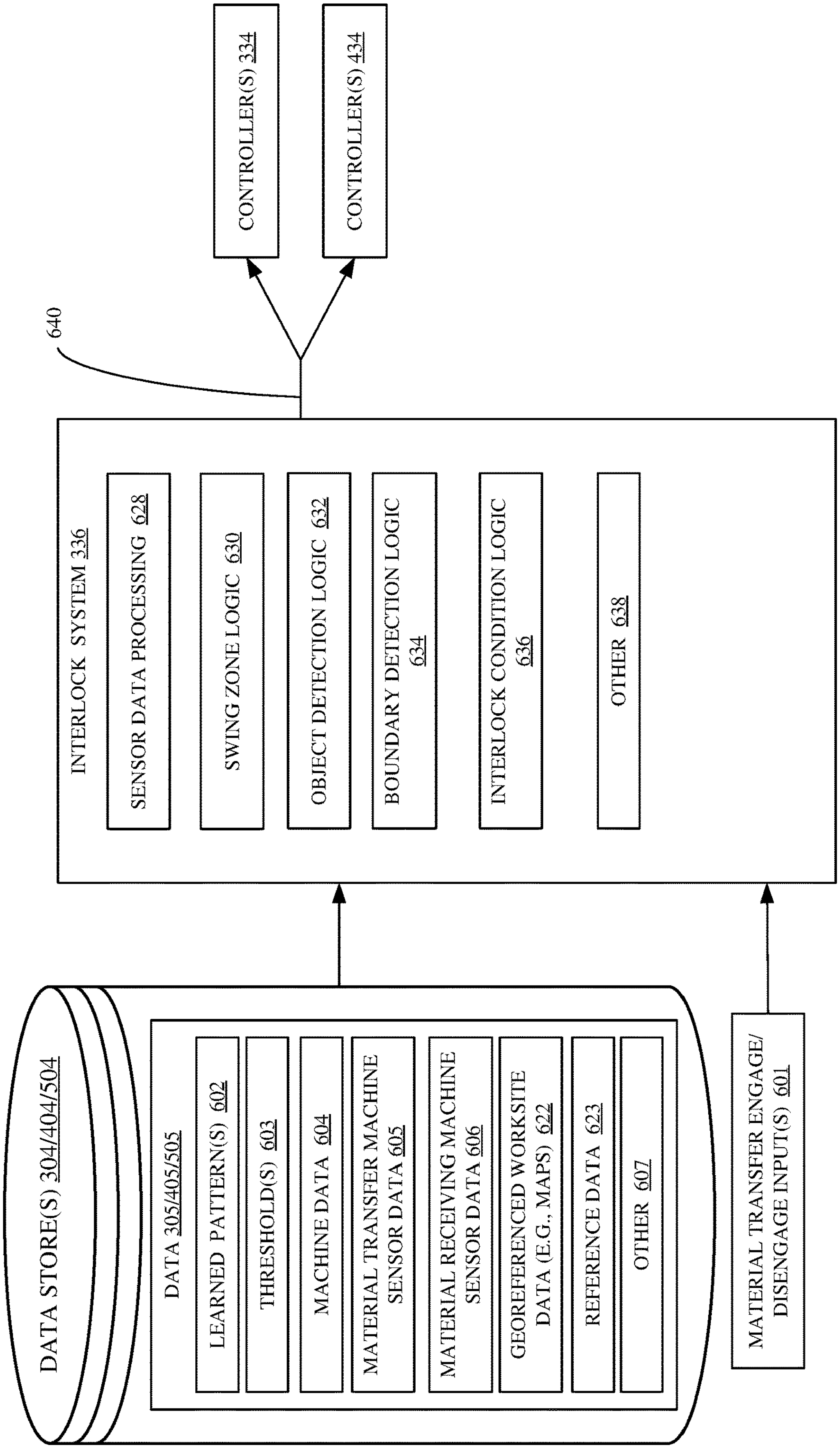
FIG. 7 is a block diagram showing one example of an interlock system.

FIG. 7 is a block diagram of portions of agricultural system 300, including interlock system 336, shown in FIG. 4, in more detail. FIG. 7 also shows the information flow among the various components shown. As illustrated, interlock system 336 obtains (e.g., retrieves or receives) one or more of data 305, 405, and 505, and material transfer engage and disengage inputs 601, and generates one or more interlock outputs 640 based thereon. The one or more interlock outputs 640 are obtained by controllers 334 or 434, or both, and can be used to control various items of agricultural system 300.

Data 305, 405, and 505 can include, in addition to learned patterns 602, thresholds 603, machine data 604, material transfer machine sensor data 605, material receiving machine sensor data 606, previously discussed in FIG. 6. Data 305, 405, and 505 can further include georeferenced worksite data 622 and reference data 623. As previously discussed, data 305, 405, and 505 can include various other data 607, some examples of which have been previously described. Material transfer engage and disengage inputs 601 were previously discussed in FIG. 6.

Georeferenced worksite data 622 includes georeferenced characteristic data of worksite(s) at which the machines (e.g., 100 and 200) of agricultural system 300 operate. Georeferenced worksite data 622 can be in the form of maps. Georeferenced worksite data 622 can indicate the position of boundaries of worksites. Georeferenced worksite data 622 can indicate the position of objects at worksites. For instance, some objects may be relatively fixed (e.g., will stay in the same position over the course of an operation or over the course of multiple operations) such that their position can be recorded and accurately relied upon (e.g., their position is not likely to change or at least is not likely to change significantly after the time the position is recorded and before the next time the position is recorded). Such relatively fixed objects can include, for example, trees, fences, large rocks, telephone line poles, power line poles, as well as various other objects.

Reference data 623 can include reference sensor data (e.g., reference images, reference point clouds, reference lidar sensor data, reference radar sensor data, reference ultrasonic sensor data, etc.) indicative of objects. In this way, sensor data generated by interlock condition sensors 152 can be compared to corresponding reference data to detect objects, as will be described below. In some examples, the reference data 623 may be used to train interlock system 336 (e.g., object detection logic 632) such that interlock system 336 utilized machine learning in detecting objects. For example, interlock system 336 (e.g., object detection logic 632) may utilize or comprise various machine learning functionality, such as a neural network, in detecting objects.

As illustrated in FIG. 7, interlock system 336 includes sensor data processing 628, swing zone logic 630, object detection logic 632, boundary detection logic 634, interlock condition logic 636, and can include various other items.

Sensor data processing 628 illustratively processes sensor data 604 and 605 to extract levels (or values) or patterns. For example, sensor data processing 628 can process sensor data generated by heading/speed sensors 325 or heading/speed sensors 425, or both, to extract levels (or values) indicative of machine speed or machine heading, or both. Sensor data processing can process sensor data generated by geographic position sensors 303 or geographic position sensors 403, or both, to extract levels (or values) indicative of machine position or location. Sensor data processing 628 can process sensor data generated by other sensors 328 or by other sensors 428, or both, in the form of machine orientation sensors, to extract levels (or values) indicative of machine orientation (e.g., machine pitch, roll, and yaw). Sensor data processing 628 can process sensor data generated by interlock condition sensors 151 to extract levels (or values) or patterns indicative of objects at the field.

Sensor data processing 628 can include or utilize various image processing functionalities such as sequential image comparison, color extraction (e.g., RGB color extraction, etc.), edge detection, black/white analysis, pixel testing, pixel clustering, shape detection, as well as any number of other suitable image processing functionalities. Additionally, sensor data processing 608 can include or utilize various machine learning functionalities or various artificial intelligence functionalities, or both. Additionally, sensor data processing 608 can include or utilize various other sensor data processing functionalities such as filtering, noise reduction, categorization, normalization, and aggregation.

Swing zone logic 630 determines a swing zone of a material transfer subsystem 353. The swing zone determined by swing zone logic can include a space (e.g., area or volume, or both) of the swing zone and a geographic location of the swing zone, through which a material transfer subsystem 353, or a portion thereof (e.g., chute 135, which includes spout 136), will travel when moved, such as when moved between storage and deployed positions. Swing zone logic 630 can determine a swing zone based on dimensions and a swing pattern of the material transfer subsystem 353 which can be stored as part of machine data 604. Swing zone logic 630 can determine a swing zone based on an orientation of the corresponding material transfer machine 100. For instance, a swing zone may differ depending on the orientation of the material transfer machine 100. Swing zone logic 630 can determine a swing zone based on a current position of the corresponding material transfer machine 100, a heading or a route of the corresponding material transfer machine 100, and a speed of the corresponding material transfer machine 100. For instance, the swing zone location may differ based on the current position, heading or route, and speed of the material transfer machine 100. Swing zone logic 630 can further determine a swing zone based on a commanded position setting as indicated by material transfer engage and disengage inputs. For instance, a swing zone may differ depending on the commanded position.

Object detection logic 632 can detect objects at the worksite based on sensor data generated by interlock condition sensors 152. Detecting objects can include detecting whether objects are present, the location of objects, as well, in some examples, object type.

Boundary detection logic 634 can detect boundaries at the worksite based on georeferenced worksite data 622. Detecting boundaries can include detecting the location of the boundaries.

Interlock condition logic 636 determines whether an interlock condition is present at the worksite based on object detection by object detection logic 632, boundary detection by boundary detection logic 634, and swing zone(s) identified by swing zone logic 630. For example, Interlock condition logic 636 can determine the presence of an interlock condition based on a determination that an object is (or will be) present and located within a swing zone. Interlock condition logic 636 can determine the presence of an interlock condition based on a determination that the swing zone will place the material transfer subsystem at, over, or on a boundary. Interlock condition logic 636 can also account for a timing aspect in determining the presence of an interlock condition. For example, interlock condition logic 636 can determine a time that the extension or retraction is to occur (e.g., the material transfer engage/disengage inputs can include a timestamp and/or a timing indication). Additionally, machine data 604 can include data indicating a length of time it takes for the material transfer subsystem 353 to extend or retract. For instance, whether an interlock condition is present may depend on the timing of the extension or retraction operation.

As can be seen, material transfer status system 335 is operable to generate interlock outputs 640. Interlock condition outputs can indicate swing zones (location, space, etc.), as determined by swing zone logic 630, objects (presence, location, type, etc.), as detected by object detection logic 632, boundaries (location), as detected by boundary detection logic 634, and interlock conditions, as determined by interlock condition logic 636.

Interlock outputs 640 can be obtained (e.g., received or retrieved) by controllers 334 or controllers 434.

Controllers 334 can generate control signals to control one or more items of agricultural system 300 including one or more controllable subsystems 316 based on the interlock outputs 640. For example, controllers 334 can control material transfer subsystem actuators 354 to maintain a current position of a material transfer subsystem 353 or to actuate the material transfer subsystem 353 to a commanded position (e.g., the commanded position indicated by a material transfer engage/disengage input 601) based on an interlock output 640. For example, where an interlock output 640 indicates the presence of an interlock condition, controllers 334 can control material transfer subsystem actuators 354 to maintain a current position of material transfer subsystem 353. In another example, where an interlock output 640 indicates that an interlock condition is not present, controllers can control the material transfer subsystem 354 to actuate the material transfer subsystem 353 to a commanded position (e.g., the commanded position indicated by a material transfer engage/disengage input 601). In another example, controllers 334 can control one or more interfaces (e.g., 318 or 364, or both) to provide an indication (e.g., display, audible output, haptic output, etc.) indicative of the presence or lack of presence of an interlock condition, a swing zone, detected objects, and detected boundaries, based on an interlock output 640.

Controllers 434 can generate control signals to control one or more items of agricultural system 300 including one or more controllable subsystems 416 based on interlock outputs 640. For example, controllers 434 can control one or more interfaces (e.g., 418 or 364, or both) to provide an indication (e.g., display, audible output, haptic output, etc.) indicative of the presence or lack of presence of an interlock condition, a swing zone, detected objects, and detected boundaries, based on an interlock output 640.

Figure 8B:
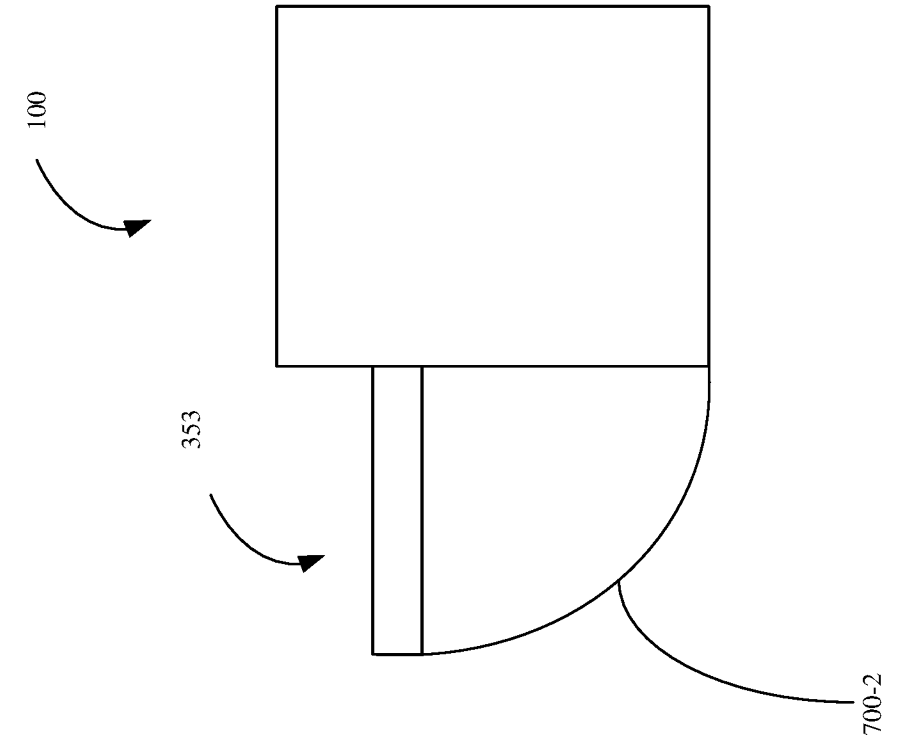
FIGS. 8A-8B are pictorial illustrations showing example swing zones.
Figure 8A:
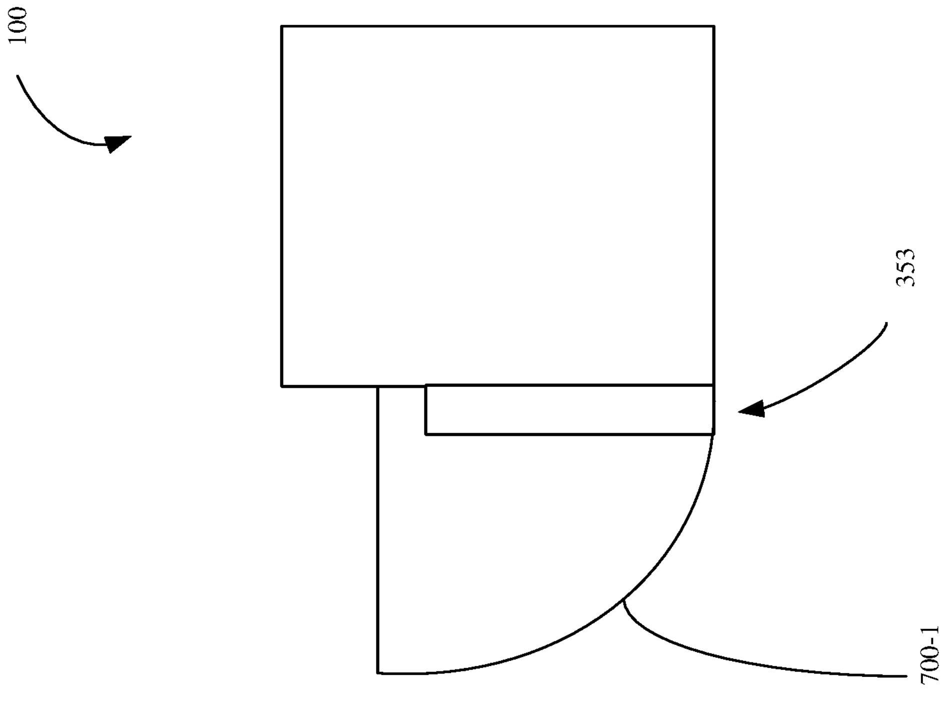

FIGS. 8A-8B are pictorial illustrations showing examples of swing zones identified by interlock system 336. In the example shown in FIGS. 8A-8B, the material transfer machine 100, for which the swing zones 700-1 and 700-2 are identified, is stationary. In some examples, material transfer machines 100 conduct a material transfer operation while stationary.

FIG. 8A shows an example in which a material transfer machine 100 is being commanded to extend the material transfer subsystem 353 from a storage position to a deployed position. Interlock system 336 determines a swing zone 700-1, including the geographic location and space of the swing zone 700-1, based on various data as described previously in FIG. 7. While the example in FIG. 8A appears to show the swing zone 700-1 in two dimensions (length and width), it will be understood that a swing zone identified by interlock system 336, including swing zone 700-1, can include three dimensions (length, width, and height). Additionally, it will be noted that a swing zone, including swing zone 700-1, may not extend from the ground, but rather be located above the ground.

FIG. 8B shows an example in which a material transfer machine 100 is being commanded to retract the material transfer subsystem 353 from a deployed position to a storage position. Interlock system 336 determines a swing zone 700-2, including the geographic location and space of the swing zone 700-2, based on various data as described previously in FIG. 7. While the example in FIG. 8B appears to show the swing zone 700-2 in two dimensions (length and width), it will be understood that a swing zone identified by interlock system 336, including swing zone 700-2, can include three dimensions (length, width, and height). Additionally, it will be noted that a swing zone, including swing zone 700-2, may not extend from the ground, but rather can be located above the ground.

9A-9B are pictorial illustrations showing examples of swing zones identified by interlock system 336. In the example shown in FIGS. 9A-9B, the material transfer machine 100, for which the swing zones 700-3 and 700-4 are identified, is moving in a travel direction 701 (701-1 and 701-2 respectively). In some examples, material transfer machines 100 conduct a material transfer operation while on the move.

Figure 9B:
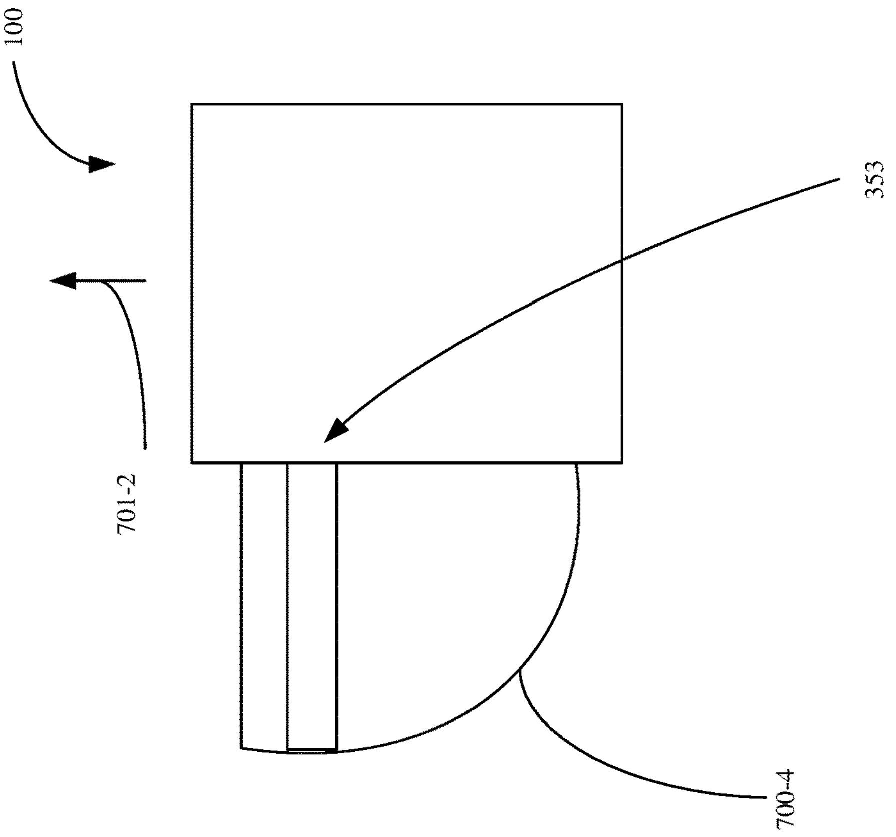
FIGS. 9A-9B are pictorial illustrations showing example swing zones.
Figure 9A:
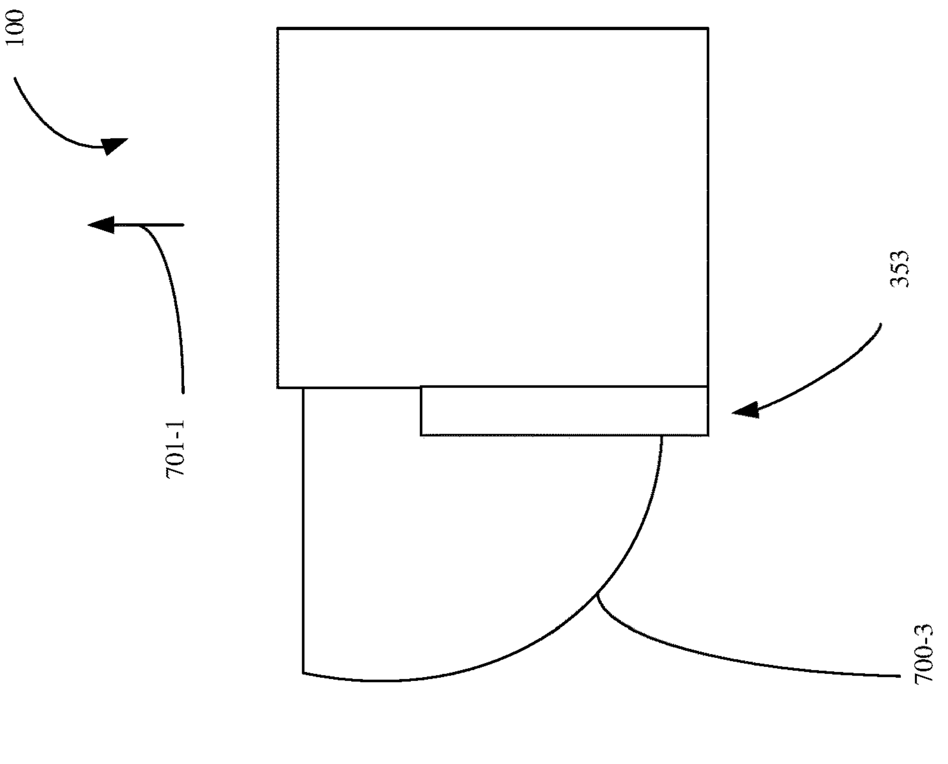

FIG. 9A shows an example in which a material transfer machine 100 is being commanded to extend the material transfer subsystem 353 from a storage position to a deployed position. Interlock system 336 determines a swing zone 700-3, including the geographic location and space of the swing zone 700-3, based on various data as described previously in FIG. 7, including the speed and travel direction of material transfer machine 100, as previously described. While the example in FIG. 9A appears to show the swing zone 700-3 in two dimensions (length and width), it will be understood that a swing zone identified by interlock system 336, including swing zone 700-3, can include three dimensions (length, width, and height). Additionally, it will be noted that a swing zone, including swing zone 700-3, may not extend from the ground, but rather be located above the ground. As can be seen in FIG. 9A, swing zone 700-3 is shifted forward as compared to swing zone 700-1, to account for the motion, in the travel direction 701-1, of material transfer machine 100.

FIG. 9B shows an example in which a material transfer machine 100 is being commanded to extend the material transfer subsystem 353 from a deployed position to a storage position. Interlock system 336 determines a swing zone 700-4, including the geographic location and space of the swing zone 700-4, based on various data as described previously in FIG. 7, including the speed and travel direction of material transfer machine 100, as previously described. While the example in FIG. 9B appears to show the swing zone 700-4 in two dimensions (length and width), it will be understood that a swing zone identified by interlock system 336, including swing zone 700-4, can include three dimensions (length, width, and height). Additionally, it will be noted that a swing zone, including swing zone 700-4, may not extend from the ground, but rather be located above the ground. As can be seen in FIG. 9B, swing zone 700-4 is shifted forward as compared to swing zone 700-2, to account for the motion, in the travel direction 701-2, of material transfer machine 100.

Figure 10:
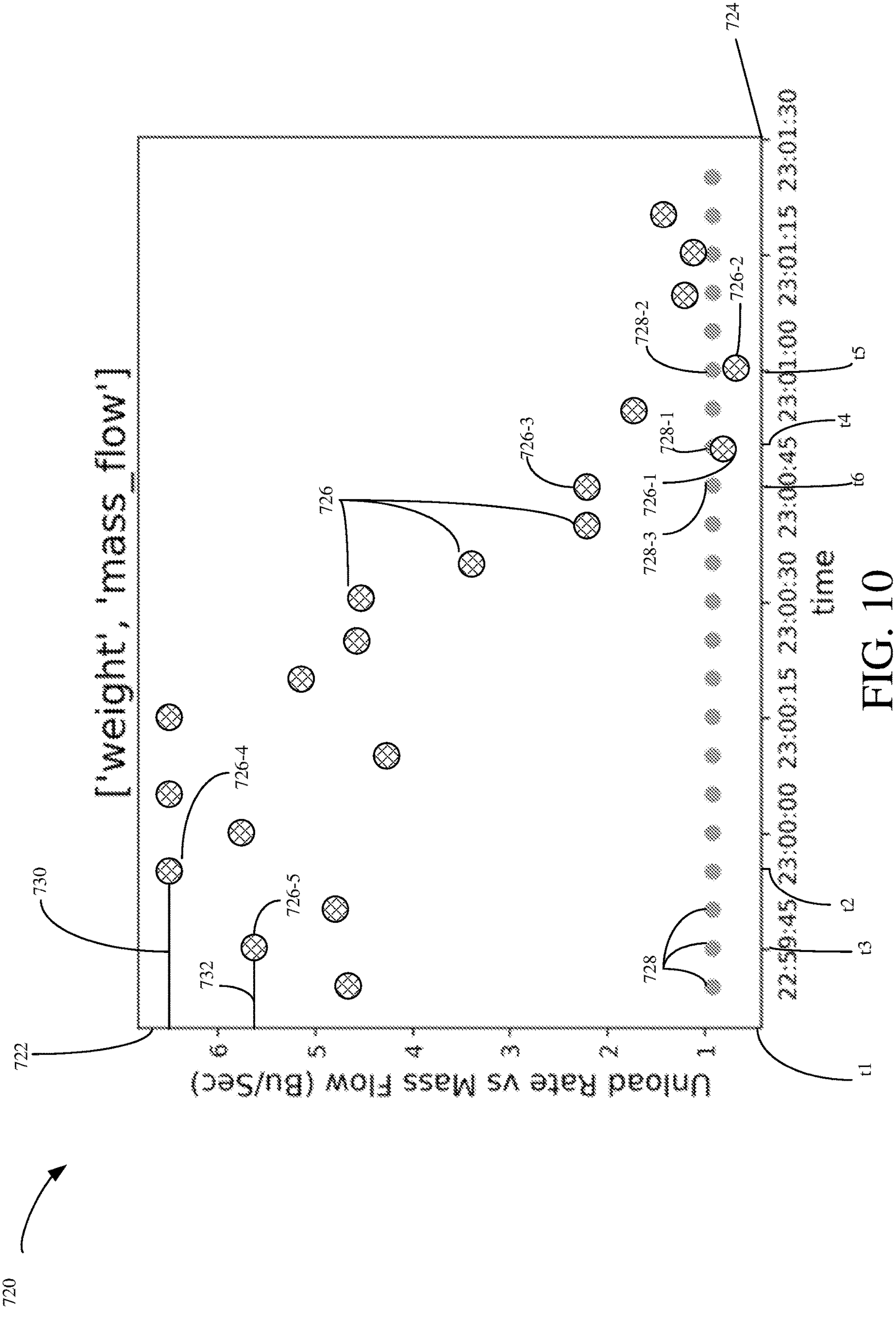
FIG. 10 is a pictorial illustration showing one example of material transfer status output in the form of a graph.

FIG. 10 is a pictorial illustration showing one example of a material transfer status output 621 in the form of a graph 720. Graph 720 depicts material transfer rate (or unload rate) and mass flow rate over time. Graph 720 includes a Y-axis 722, an X-axis 724, a plurality of material transfer rate (or unload rate) values 726 (shown in patterned fill), and a plurality of mass flow values 728 (shown in solid fill). Y-axis 722 illustratively comprises a flow rate value scale expressed in bushels per second (Bu/Sec) and in increments of 1 Bu/Sec. X-axis 724 is a time scale (in twenty four-hour or military time) in increments of fifteen seconds. Graph 720 illustratively graphs (and thus tracks) material transfer rate and mass flow rate over the course of a material transfer operation. The material transfer operation begins at time t1 (illustratively 22:59:30). As can be seen, material transfer status system 335 can determine a plurality of material transfer rate values during the course of a material transfer operation and can determine a plurality of mass flow values during the course of a material transfer operation.

As previously discussed in FIG. 6, wear and failure logic 619 can determine wear or failure of a material transfer subsystem 353 based on a material transfer rate value. As previously discussed, wear and failure logic 619 can determine wear or failure based on a ramp up time, that is, the time it takes for material transfer subsystem to ramp up to a reference material transfer rate value. The reference material transfer rate value can be, for example, a threshold value or, in another example, a peak value (where the peak material transfer value is the peak value during the course of a given material transfer operation).

In the example illustrated in FIG. 10, if the reference material transfer rate value is a peak value, wear and failure logic 619 would identify, as a ramp up time, an amount of time between t1 (when the material transfer operation begins) and t2 (where the material transfer rate value reaches a peak value for the first time as indicated by 726-4). The amount of time between t1 and t2 is illustratively twenty-five seconds and is illustratively represented by line 730.

In the example illustrated in FIG. 10, if the reference material transfer rate value is another type of reference material transfer rate value, such as a threshold, rated, or other type of reference material transfer rate value, wear and failure logic 619 would identify, as a ramp up time, an amount of time between t1 (when the material transfer operation begins) and t3 (where the material transfer rate value meets or exceeds the threshold, rated, or other type of reference material transfer rate value). In the illustrated example, the threshold, rated, or other type of reference material transfer rate value is illustratively five Bu/Sec (though it could be other values in other examples). Thus, wear and failure logic 619 would identify, as a ramp up time, an amount of time between t1 and t3 (where the material transfer rate value meets or exceeds five Bu/Sec as indicated by 726-5). The amount of time between t1 and t3 is illustratively fifteen seconds and illustratively represented by line 732.

The determined ramp up time can be compared to a reference ramp up time (e.g., historical, threshold, rated, etc.) to identify wear and failure. For instance, where the ramp up time fails to satisfy the reference ramp up time (e.g., is greater than) wear or failure may be indicated.

As previously discussed in FIG. 6, material transfer status logic 614 can determine a status of a material transfer operation based on a material transfer rate value. As previously discussed, material transfer rate logic 616 can determine a status of a material transfer operation based on a comparison (by comparison logic 618) of a material transfer rate value to a reference value, such as a threshold value or a mass flow value.

In the example illustrated in FIG. 10, if the reference value used by comparison logic 618 is a mass flow value, then material transfer status logic 614 may determine that the material transfer operation is complete at one of t4, t5, or t6. For example, where the material transfer rate value need only be at or below a mass flow value, then material transfer status logic 614 may determine that the material transfer operation is complete at t4 where the material transfer rate value 726-1 is at or below the corresponding mass flow value 728-1. In another example, where the material transfer rate value need be below a mass flow value by a threshold amount, then material transfer status logic 614 may determine that the material transfer operation is complete at t5 where the material transfer rate value 726-2 is below the corresponding mass flow value 728-2 by the threshold amount. In another example, where the material transfer rate value need only be within (e.g., only greater than a mass flow value by at or less than a threshold amount), then material transfer status logic 614 may determine that the material transfer operation is complete at t6 where the material transfer rate value 726-3 is only greater than the corresponding mass flow value 728-3 by at or less than a threshold amount.

In the example illustrated in FIG. 10, if the reference value used by comparison logic 618 is another type of reference value, such as a threshold value, for instance 1 Bu/Sec, then material transfer status logic 614 may determine that the material transfer operation is complete at t4 where the material transfer rate value 726-2 is below the threshold value of 1 Bu/Sec for the first time.

Figure 11:
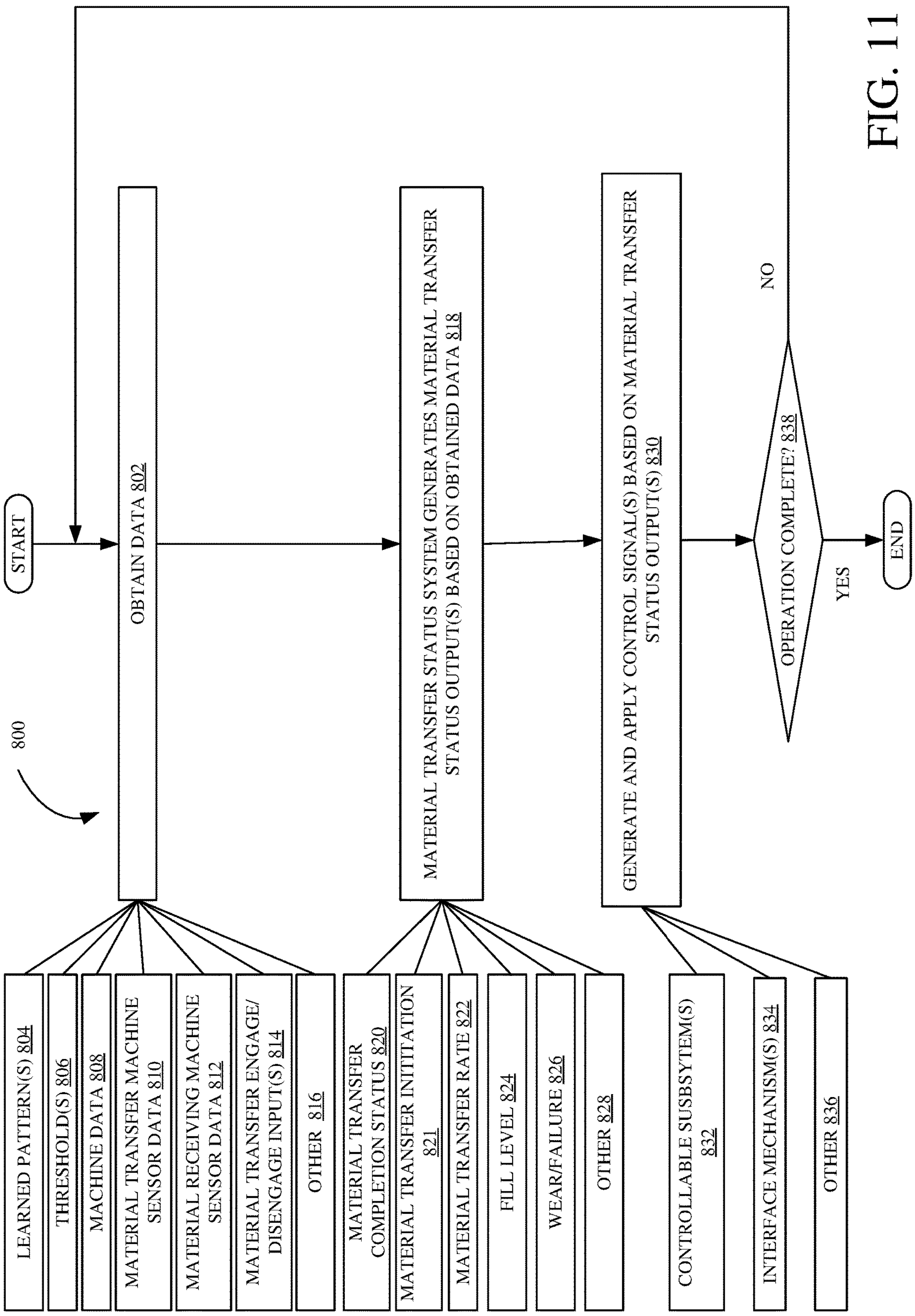
FIG. 11 is a flow chart illustrating one example of operation of agricultural system architecture in generating material transfer status output(s) and control based thereon.

FIG. 11 is a flowchart showing one example operation 800 of material transfer status system 335. Operation 800 begins at block 802 where one or more items of data are obtained (e.g., retrieved or received) by material transfer status system 335. As indicated by block 804, one or more learned patterns 602 can be obtained. One or more thresholds 603 can be obtained, as indicated by block 806. Machine data 604 can be obtained, as indicated by block 808. Material transfer machine sensor data 605 can be obtained, as indicated by block 810. Material receiving machine sensor data 606 can be obtained, as indicated by block 812. Material transfer engage/disengage inputs 601 can be obtained, as indicated by block 814. Various other data can also be obtained, as indicated by block 816.

Operation 800 continues at block 818 where material transfer status system 335 generates one or more material transfer status outputs 621 based on the one or more items of data obtained at block 802. As indicated by block 820, a material transfer status output 621 can indicate whether or not a material transfer operation has been completed (e.g., completed to a desired or threshold level) as determined by material transfer status logic 614. A material transfer status output 621 can indicate that a material transfer operation should be initiated as determined by material transfer status logic 614, as indicated by block 821. A material transfer status output 621 can indicate a material transfer rate as determined by material transfer rate logic 616, as indicated by block 822. A material transfer status output 621 can indicate a fill level as determined by fill level logic 617, as indicated by block 824. A material transfer status output 621 can indicate wear or failure of a material transfer subsystem 353 as determined by wear and failure logic 619, as indicated by block 826. A material transfer status output 621 can indicate various other information, as indicated by block 828.

Operation 800 continues at block 830 where the one or more material transfer status outputs 621 are obtained (e.g., received or retrieved) by controllers 334 or controllers 434, or both, and controllers 334 or controllers 434, or both, generate one or more control signals to control one or more items of agricultural system 300.

As indicated by block 832, controllers 334 can generate control signals to control one or more controllable subsystems 316. For example, controllers 334 can generate control signals to control material transfer subsystem actuators 354 to shutdown (e.g., shutdown conveyance mechanism), and, in some examples, retract material transfer subsystem 353 based on a material transfer status output 621 indicating that a material transfer operation has been completed. In another example, controllers 334 can generate control signals to control material transfer subsystem actuators 354 to extend material transfer subsystem 353 to a deployed position or start up (e.g., start-up conveyance mechanism) material transfer subsystem 353, or both, based on a material transfer status output 621 indicating that a material transfer operation should be initiated. As further indicated by block 832, controllers 434 can generate control signals to control one or more controllable subsystems 416.

As indicated by block 834, controllers 334 can generate control signals to control one or more interface mechanisms (e.g., 318 or 364, or both) to provide an indication (e.g., display, audible output, haptic output, etc.). Such an indication may be indicative of the status of the material transfer operation (e.g., complete, not yet complete, occurring, not occurring), that a material transfer operation should be initiated, the fill level of a material receptacle, a material transfer rate, or wear or failure of the material transfer subsystem. As further indicated by block 834, controllers 434 can generate control signals to control one or more interface mechanisms (e.g., 418 or 364, or both) to provide an indication (e.g., display, audible output, haptic output, etc.). Such an indication may be indicative of the status of the material transfer operation (e.g., complete, not yet complete, occurring, not occurring), that a material transfer operation should be initiated, the fill level of a material receptacle, a material transfer rate, or wear or failure of the material transfer subsystem.

As indicated by block 836, controllers 334 or controllers 434, or both, can generate control signals to control various other items of agricultural system 300.

Operation 800 proceeds to block 838 where it is determined if the operation at the worksite is complete. If it is determined that the operation at the worksite is not yet complete, then operation 800 returns to block 802. If it is determined that the operation at the worksite is complete, then operation 800 ends.

Figure 12:
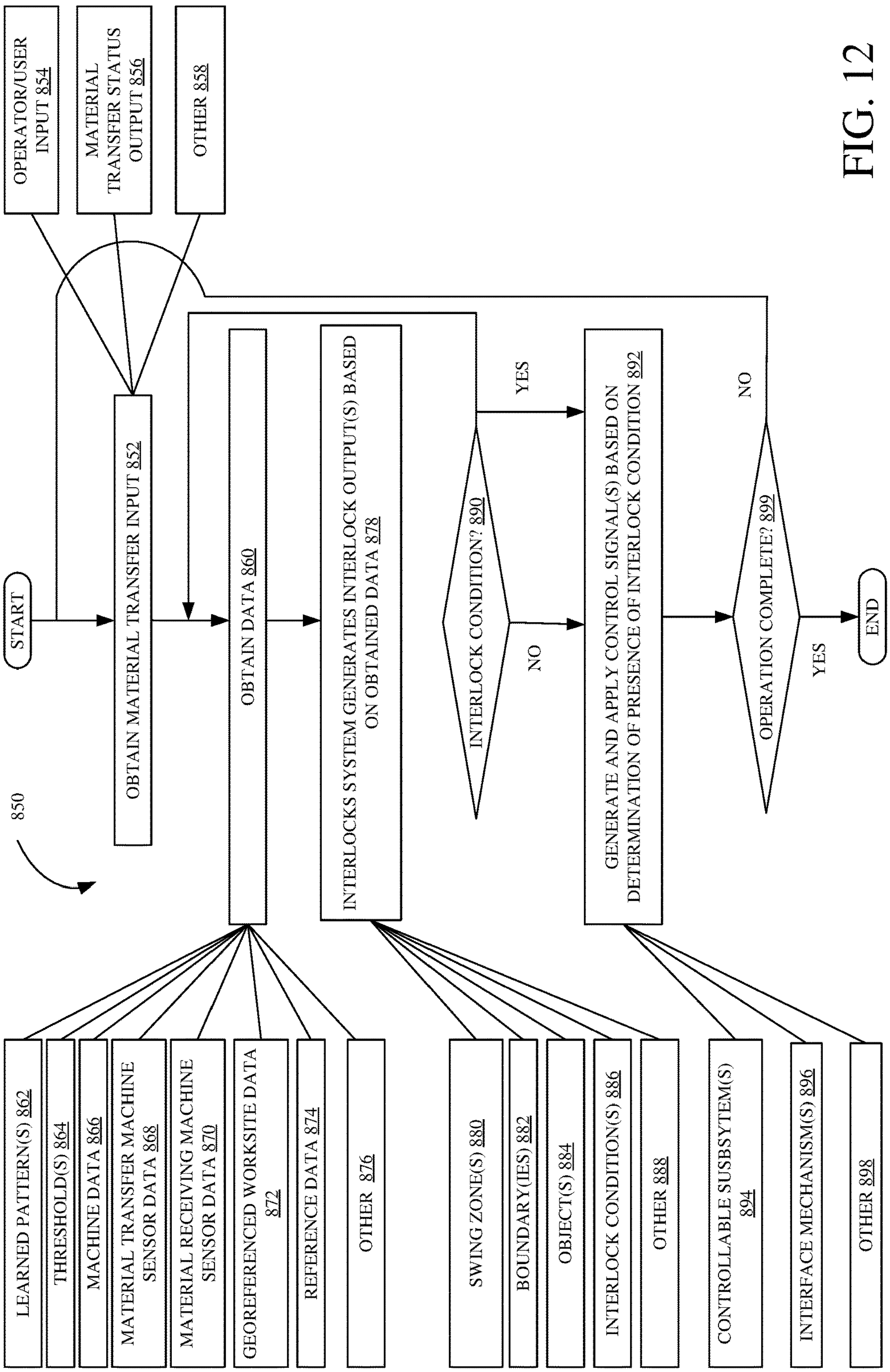
FIG. 12 is a flow chart illustrating one example of operation of agricultural system architecture in generating interlock output(s) and control based thereon.

FIG. 12 is a flowchart showing one example operation 850 of interlock system 336. Operation 850 begins at block 852 where a material transfer input is obtained. The material transfer input may be in the form of a request, command, recommendation, or other information indicating that a material transfer operation should be terminated or initiated. As indicated by block 854, the material transfer input may be input by an operator 360 (such as through an operator interface mechanism 318) or by a user 366 (such as through a user interface mechanism 364). As indicated by block 856, the material transfer input may be a material transfer status output 621 generated by material transfer status system 335, such as a material transfer status output 621 that indicates completion of a material transfer operation or a material transfer status output 621 that indicates that a material transfer operation should be initiated. The material transfer input may be a variety of other types of inputs, as indicated by block 858.

Operation 850 proceeds at block 860 where one or more items of data are obtained (e.g., retrieved or received) by interlock system 336. As indicated by block 862, one or more learned patterns 602 can be obtained. One or more thresholds 603 can be obtained, as indicated by block 864. Machine data 604 can be obtained, as indicated by block 866. Material transfer machine sensor data 605 can be obtained, as indicated by block 868. Material receiving machine sensor data 606 can be obtained, as indicated by block 870. Georeferenced worksite data 622 can be obtained, as indicated by block 872. Referenced data 874 can be obtained, as indicated by block 874. Various other data can also be obtained, as indicated by block 876.

Operation 850 continues at block 878 where interlock system 336 generates one or more interlock outputs 640 based on the one or more items of data obtained at block 860. As indicated by block 880, an interlock output 640 can indicate one or more swing zones as determined by swing zone logic 630. As indicated by block 882, an interlock output 640 can indicate one or more detected boundaries (and characteristics thereof) of the worksite as detected by boundary detection logic 634. As indicated by block 884, an interlock output 640 can indicate one or more detected objects (and characteristics thereof) as detected by object detection logic 632. As indicated by block 886, an interlock output 640 can indicate the presence of an interlock condition as determined by interlock condition logic 636. An interlock output 640 can indicate various other information, as indicated by block 888.

At block 890, interlock system 336 determines whether an interlock condition is present. For example, interlock system 336 can, to determine whether an interlock condition is present, determine whether an object is or will be in a swing zone or whether a swing zone will place the material transfer subsystem 353 at, on, or over a boundary of the worksite, or both. If interlock system 336 determines that an object is or will be in a swing zone or that a swing zone will place the material transfer subsystem 353 at, on, or over a boundary of the worksite, or both, then interlock system 336 determines that an interlock condition is present. If interlock system 3369 determines that an object is not or will not be in a swing zone and that the swing zone will not place the material transfer subsystem 353, at, on, or over a boundary of the worksite, then interlock system 336 determines that an interlock condition is not present.

If, at block 890, it is determined that an interlock condition is not present, then processing proceeds to block 892 where controllers 334 or controllers 434, or both, generate one or more control signals to control one or more items of agricultural system 300 based on the determination that an interlock condition is not present. For example, when an interlock condition is not present, controllers 334 can generate control signals to control one or more controllable subsystems 316, as indicated by block 894. For example, at block 894, controllers 334 can generate control signals to control material transfer subsystem 353 in a way corresponding to the material transfer input obtained at block 852. For example, where the material transfer input obtained at block 852 requests, recommends, or commands shutdown and retraction (i.e., termination of material transfer operation) or indicates that a material transfer operation is complete, then controllers 334 can generate control signals to control material transfer subsystem actuators 354 to shutdown (e.g., shutdown conveyance mechanism), and retract material transfer subsystem 353 to a storage position. In another example, where the material transfer input obtained at block 852 requests, recommends, or commands start up and extension (i.e., initiation of material transfer operation) or indicates that a material transfer operation should be initiated, then controllers 334 can generate control signals to control material transfer subsystem actuators 354 to extend material transfer subsystem 353 to a deployed position and to start up (e.g., start-up conveyance mechanism) material transfer subsystem 353.

Additionally, when it is determined that an interlock condition is not present, controllers 334 can generate control signals to control one or more interface mechanisms (e.g., 318 or 364, or both) to provide an indication (e.g., display, audible output, haptic output, etc.), as indicated by block 896. Such an indication may be indicative of an interlock condition not being present. Additionally, when it is determined that an interlock condition is not present, controllers 434 can generate control signals to control one or more interface mechanisms (e.g., 418 or 364, or both) to provide an indication (e.g., display, audible output, haptic output, etc.), as indicated by block 896. Such an indication may be indicative of an interlock condition not being present. Controllers 334 or controllers 434, or both, can generate control signals to control various other items of agricultural system 300 based on the determination that an interlock condition is not present, as indicated by block 888.

If, at block 890, it is determined that an interlock condition is present then processing may proceed to block 892 or return to block 860, or both. At block 892, controllers 334 or controllers 434, or both, can generate one or more control signals to control one or more items of agricultural system 300 based on the determination that an interlock condition is present. For example, when an interlock condition is present, controllers 334 controllers 334 can generate control signals to control one or more controllable subsystems 316, as indicated by block 894. For example, at block 894, controllers 334 can generate control signals to control material transfer subsystem 353 in a way corresponding to the material transfer input obtained at block 852. For example, where the material transfer input obtained at block 852 requests, recommends, or commands shutdown and retraction (i.e., termination of material transfer operation) or indicates that a material transfer operation is complete, then controllers 334 can generate control signals to control material transfer subsystem actuators 354 to shutdown (e.g., shutdown conveyance mechanism) and to maintain the position of material transfer subsystem 353 (e.g., prevent retraction of material transfer subsystem 353). In another example, controllers 334 can maintain the position of material transfer subsystem 353 (e.g., prevent retraction of material transfer subsystem 353) and control actuators 354 to keep the conveyance mechanism operating (e.g., the conveyance mechanism may not be shutdown). In another example, where the material transfer input obtained at block 852 requests, recommends, or commands start up and extension (i.e., initiation of material transfer operation) or indicates that a material transfer operation should be initiated, then controllers 334 can generate control signals to control material transfer subsystem actuators 354 to prevent start up and extension of material transfer subsystem 353 (e.g., keep material transfer subsystem 353 in storage position and conveyance mechanism turned off).

Additionally, when it is determined that an interlock condition is present, controllers 334 can generate control signals to control one or more interface mechanisms (e.g., 318 or 364, or both) to provide an indication (e.g., display, audible output, haptic output, etc.), as indicated by block 896. Such an indication may be indicative of an interlock condition being present. Additionally, when it is determined that an interlock condition is present, controllers 434 can generate control signals to control one or more interface mechanisms (e.g., 418 or 364, or both) to provide an indication (e.g., display, audible output, haptic output, etc.), as indicated by block 896. Such an indication may be indicative of an interlock condition being present. Controllers 334 or controllers 434, or both, can generate control signals to control various other items of agricultural system 300 based on the determination that an interlock condition is present, as indicated by block 888.

Additionally, or alternatively, at block 890, when it is determined that an interlock condition is present, then processing may, additionally, or alternatively, return to block 860 where one or more items of additional data is obtained and interlock system 336 again generates one or more interlock outputs 640 based on the one or more items of additional data and further determines, again, at block 890, if an interlock condition is present. For example, by virtue of movement of a material transfer machine 100 or by virtue of movement of other objects at the field, such as a material receiving machine 200, or both, an interlock condition that was present at a first iteration (at a first time) at block 890 may not be present at a second, later, iteration (at a second, later time) at block 890.

Operation 850 proceeds to block 899 where it is determined if the operation at the worksite is complete. If it is determined that the operation at the worksite is not yet complete, then operation 850 returns to block 852. If it is determined that the operation at the worksite is complete, then operation 850 ends.

Figure 13:
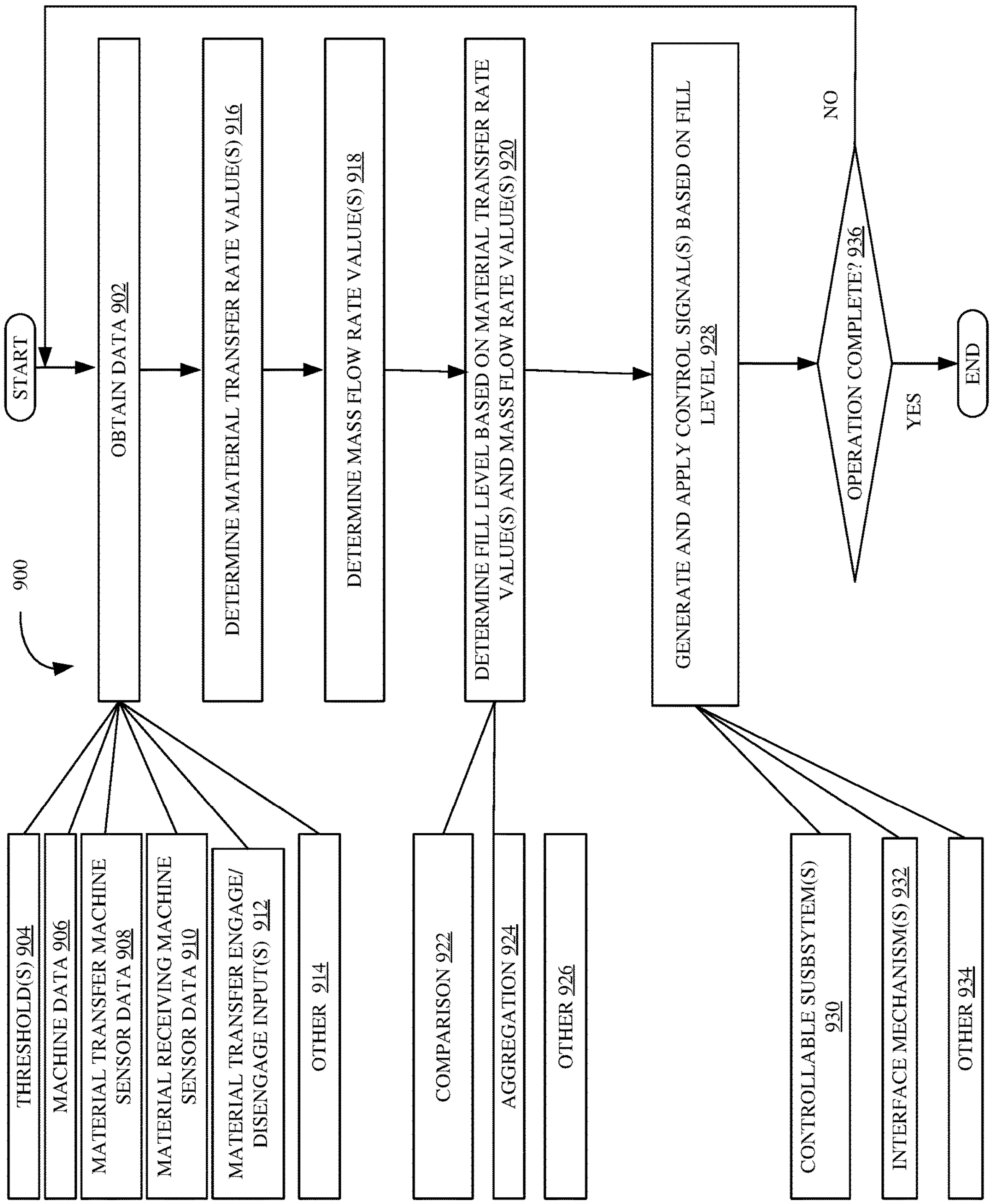
FIG. 13 is a flow chart illustrating one example of operation of agricultural system architecture in generating material transfer rates and fill levels and control based thereon.

FIG. 13 is a flowchart showing one example operation 900 of material transfer status system 335. Operation 900 begins at block 902 where one or more items of data are obtained (e.g., retrieved or received) by material transfer status system 335. As indicated by block 904, one or more thresholds 603 can be obtained. Machine data 604 can be obtained, as indicated by block 906. Material transfer machine sensor data 605 can be obtained, as indicated by block 908. For example, but not by limitation, mass flow sensor data from one or more mass flow sensors 324 can be obtained at block 908. Material receiving machine sensor data 606 can be obtained, as indicated by block 910. For example, but not by limitation, weight sensor data from one or more weight sensors 380 can be obtained at block 910. Material transfer engage/disengage inputs 601 can be obtained, as indicated by block 912. As previously discussed, the material transfer engage/disengage inputs 601 can be timestamped inputs indicating timing of when a material transfer operation is initiated and when the material transfer operation is terminated. Various other data can also be obtained, as indicated by block 914.

Processing proceeds at block 916 where material transfer rate logic 616 determines one or more material transfer rate values based on one or more items of data obtained at block 902. As previously discussed, material transfer rate logic 616 can determine a material transfer rate value based on a difference between weight of material in a material receptacle, as indicated by one or more weight sensors 380, at a first time and weight of material in a material receptacle, as indicated by one or more weight sensors 380, at a second time. Material transfer rate logic 616 can generate a plurality of material transfer rate values throughout the course of a material transfer operation and can generate an overall material transfer rate value for a material transfer operation, or both. An overall material transfer rate value for a material transfer operation may be determined based a change in weight of material in a material receptacle, as indicated by one or more weight sensors 380, at the start time of the material transfer operation (the start time indicated by a material transfer engage input 601 or in another way) and weight of material in the material receptacle, as indicated by one or more weight sensors 380, at the end time of the material transfer operation (the end time indicated by a material transfer disengage input 601 or in another way). Material transfer rate logic 616 can also generate one or more instantaneous material transfer rate values, each being indicative of a current material transfer rate at a given time during the material transfer operation. Each instantaneous material transfer rate value may be determined based on a change in weight of material in a material receptacle, as indicated by one or more weight sensors 380, at a first time (e.g., start time or the last time an instantaneous material transfer rate was determined) and a second time. In some examples, material transfer rate logic 616 may determine an instantaneous material transfer value at select intervals.

Processing continues at block 918 where fill level logic 617 determines one or more mass flow values based on one or more items of data obtained at block 902. As previously discussed, fill level logic 617 can determine a mass flow value based on mass flow sensor data provided by one or more mass flow sensors 324.

Processing proceeds at block 920 where fill level logic 617 determines a fill level of a material receptacle of a material transfer machine 100 based on one or more material transfer rate value(s) and one or more mass flow rate value(s). In one example, as indicated by block 922, fill level logic 617 can determine when the material receptacle is empty based on a comparison of an instantaneous material transfer rate value to a corresponding reference value, such as a corresponding mass flow rate value or a corresponding threshold value. For example, where the instantaneous material transfer rate value is at, less than, or only greater than by a threshold amount, the reference value, such as the corresponding mass flow value or corresponding threshold value, fill level logic 617 can determine that the material receptacle of material transfer machine 100 is empty at that time. The determination that the material receptacle is empty is helpful in accurately determining a fill level of the material receptacle going forward as only mass flow values received at and/or after that time that the material receptacle is empty will be used (e.g., aggregated as indicated by block 924) in calculating the fill level of the material receptacle going forward. In another example, an overall material transfer rate value can be used to determine a total amount of material taken out of the material receptacle during a material transfer operation. The mass flow values during the material transfer operation and up to the time that the determination of the fill level is being determined can be aggregated, as indicated by block 924, to determine a total amount of material added to the material receptacle from the time that the material transfer operation was initiated up to the time that determination of the fill level is being determined. The total amount of material added to the material receptacle can be aggregated, as indicated by block 924, with the fill level of the material receptacle prior to the initiation of the material transfer operation (e.g., previously determined fill level by fill level logic) to generate a total amount of material. The total amount of material taken out of the material receptacle during the material transfer operation can be taken from the total amount of material to determine the fill level at the time the determination of the fill level is being determined. In yet another example, where the material transfer operation has not been terminated, one or more instantaneous material transfer rate values can be aggregated, as indicated by block 924, and used in determining a fill level of the material receptacle during the material transfer operation. For instance, the aggregated instantaneous material transfer rate values can be aggregated, as indicated by block 924, to determine a total amount of material taken out of the material receptacle up to a given time in the material transfer operation. The mass flow values from the time the material transfer operation is initiated up to the given time in the material transfer operation can be aggregated, as indicated by block 924, to determine a total amount of material added to the material receptacle up to the given time in the material transfer operation and can be aggregated (as indicated by block 924) with the fill level of the material receptacle prior to the initiation of the material transfer operation (e.g., previously determined fill level by fill level logic) to generate a total amount of material in the material receptacle up to the given time in the material transfer operation. The total amount of material taken out of the material receptacle up to the given time can be taken from the total amount of material in the material receptacle up to the given time to determine a fill level of the material receptacle at the given time. These are merely some examples.

Additionally, it will be understood that fill level logic 617 can utilize various other functionalities in determining fill levels, as indicated by block 926.

Processing proceeds at block 928 where controllers 334 or controllers 434, or both, generate one or more controls signals to control one or more items of agricultural system based on fill level(s) determined by fill level logic 617.

As indicated by block 930, controllers 334 can generate control signals to control one or more controllable subsystems 316. For example, controllers 334 can generate control signals to control material transfer subsystem actuators 354 to shutdown (e.g., shutdown conveyance mechanism), and, in some examples, retract material transfer subsystem 353 based on a determined fill level, such as a fill level indicating that the material receptacle of the material transfer machine is empty. In another example, controllers 334 can generate control signals to control material transfer subsystem actuators 354 to extend material transfer subsystem 353 to a deployed position or start up (e.g., start-up conveyance mechanism) material transfer subsystem 353, or both, based on a determined fill level, such as a fill level indicating that the material receptacle is full (at least to a threshold level) and thus that a material transfer operation should be initiated. As further indicated by block 930, controllers 434 can generate control signals to control one or more controllable subsystems 416, for example, but not by limitation, controllers 434 can generate control signals to control propulsion subsystem 450 to control the speed of a receiving machine 200.

As indicated by block 932, controllers 334 can generate control signals to control one or more interface mechanisms (e.g., 318 or 364, or both) to provide an indication (e.g., display, audible output, haptic output, etc.). Such an indication may be indicative of the fill level of the material receptacle, which may include an alert or recommendation based on the fill level (e.g., an alert that the material receptacle is full or nearing full, at least to the threshold level, a recommendation to begin a material transfer operation, an alert that the material receptacle is empty, a recommendation to terminate a material transfer operation). As further indicated by block 932, controllers 434 can generate control signals to control one or more interface mechanisms (e.g., 418 or 364, or both) to provide an indication (e.g., display, audible output, haptic output, etc.). Such an indication may be indicative of the fill level of the material receptacle, which May include an alert or recommendation based on the fill level (e.g., an alert that the material receptacle is full or nearing full, at least to the threshold level, a recommendation to begin a material transfer operation, an alert that the material receptacle is empty, a recommendation to terminate a material transfer operation).

As indicated by block 934, controllers 334 or controllers 434, or both, can generate control signals to control various other items of agricultural system 300.

Processing proceeds to block 936 where it is determined if the operation at the worksite is complete. If it is determined that the operation at the worksite is not yet complete, then processing returns to block 902. If it is determined that the operation at the worksite is complete, then processing ends.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores May be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, generators, and interactions. It will be appreciated that any or all of such systems, components, generators, and interactions may be implemented by hardware items, such as one or more processors, one or more processors executing computer executable instructions stored in memory, memory, or other processing components, some of which are described below, that perform the functions associated with those systems, components, generators, or interactions. In addition, any or all of the systems, components, generators, and interactions may be implemented by software that is loaded into a memory and is subsequently executed by one or more processors or one or more servers or other computing component(s), as described below. Any or all of the systems, components, generators, and interactions may also be implemented by different combinations of hardware, software, firmware, etc., some examples of which are described below. These are some examples of different structures that may be used to implement any or all of the systems, components, generators, and interactions described above. Other structures may be used as well.

Figure 14:
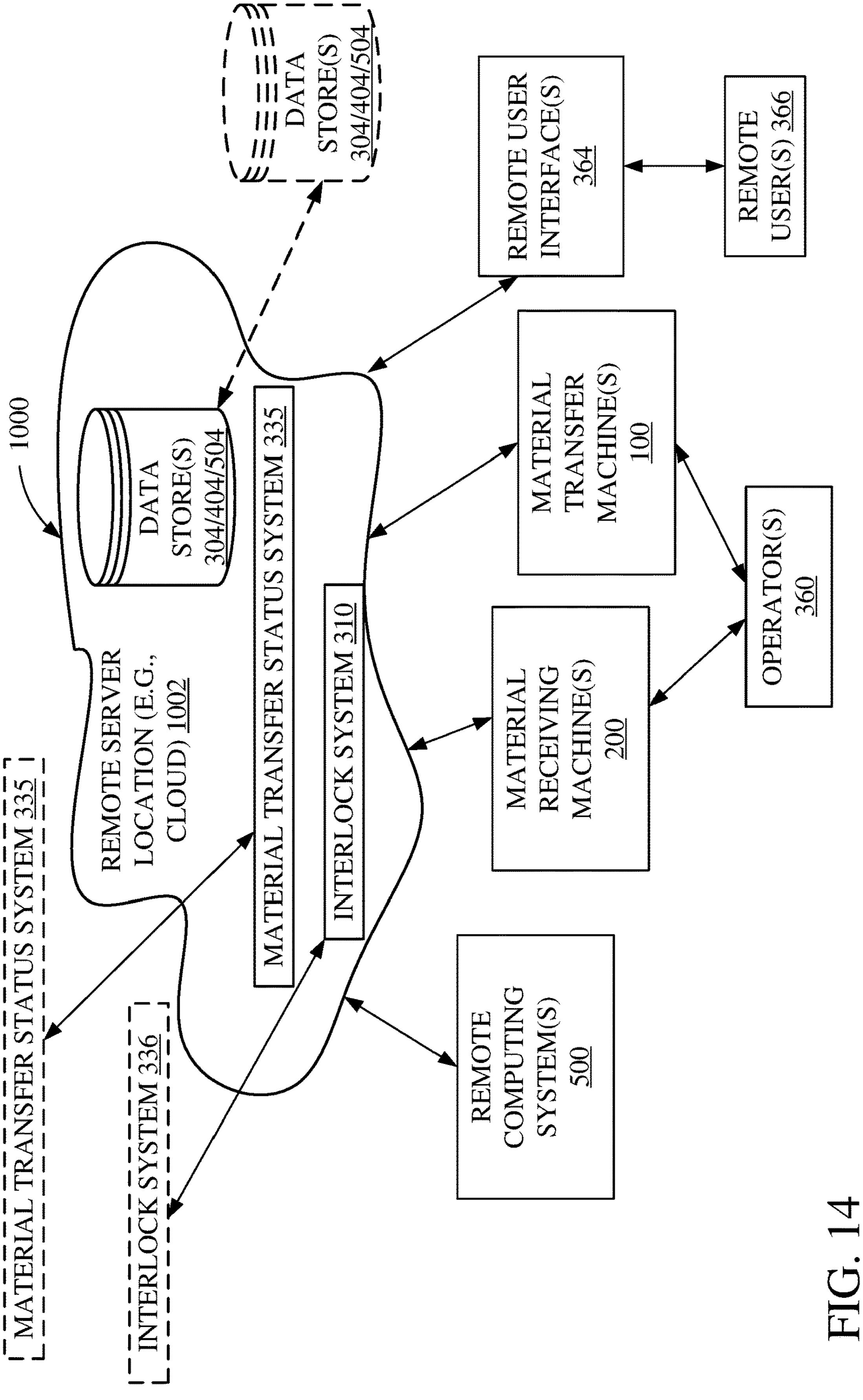
FIG. 14 is a block diagram showing one example of items of an agricultural system architecture in communication with a remote server architecture.

FIG. 14 is a block diagram of a remote server architecture 1000. FIG. 14, also shows one or more material transfer machines 100, one or more material receiving machines 200, one or more remote computing systems 500, and one or more remote user interface mechanisms 364 in communication with the remote server environment. The material transfer machines 100, material receiving machines 200, remote computing systems 500, and remote user interface mechanisms 364 communicate with elements in a remote server architecture 1000. In some examples, remote server architecture 1000 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in previous figures as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 14, some items are similar to those shown in previous figures and those items are similarly numbered. FIG. 14 specifically shows that material transfer status system 335, interlock system 336, and one or more of data stores 304, data stores 404, and data stores 504, may be located at a server location 1002 that is remote from the material transfer machines 100, material receiving machines 200, remote computing systems 500, and remote user interface mechanisms 364. Therefore, in the example shown in FIG. 14, material transfer machines 100, material receiving machines 200, remote computing systems 500, and remote user interface mechanisms 364 access systems through remote server location 1002. In other examples, various other items may also be located at server location 1002, such as various other items of agricultural system architecture 300.

FIG. 14 also depicts another example of a remote server architecture. FIG. 14 shows that some elements of previous figures may be disposed at a remote server location (e.g., cloud) while others may be located elsewhere. By way of example, one or more of data store(s) 304, 404, and 504 may be disposed at a location separate from location 1002 and accessed via the remote server at location 1002. Similarly, material transfer status system 335 may be disposed at a location separate from locations 1002 and accessed via the remote server at locations 1002. Similarly, interlock system 336 may be disposed at a location separate from locations 1002 and accessed via the remote server at locations 1002. Regardless of where the elements are located, the elements can be accessed directly by material transfer machines 100, material receiving machines 200, remote computing systems 500, and remote user interface mechanisms 364 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users, or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As a mobile machine (e.g., material transfer machine 100 or material receiving machine 200) comes close to the machine containing the information collection system, such as a fuel truck prior to fueling, the information collection system collects the information from the mobile machine using any type of ad-hoc wireless connection. The collected information may then be forwarded to another network when the machine containing the received information reaches a location where wireless telecommunication service coverage or other wireless coverage—is available. For instance, a fuel truck may enter an area having wireless communication coverage when traveling to a location to fuel other machines or when at a main fuel storage location. All of these architectures are contemplated herein. Further, the information may be stored on a mobile machine until the mobile machine enters an area having wireless communication coverage. The mobile machine, itself, may send the information to another network.

It will also be noted that the elements of previous figures, or portions thereof, May be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1000 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 15:
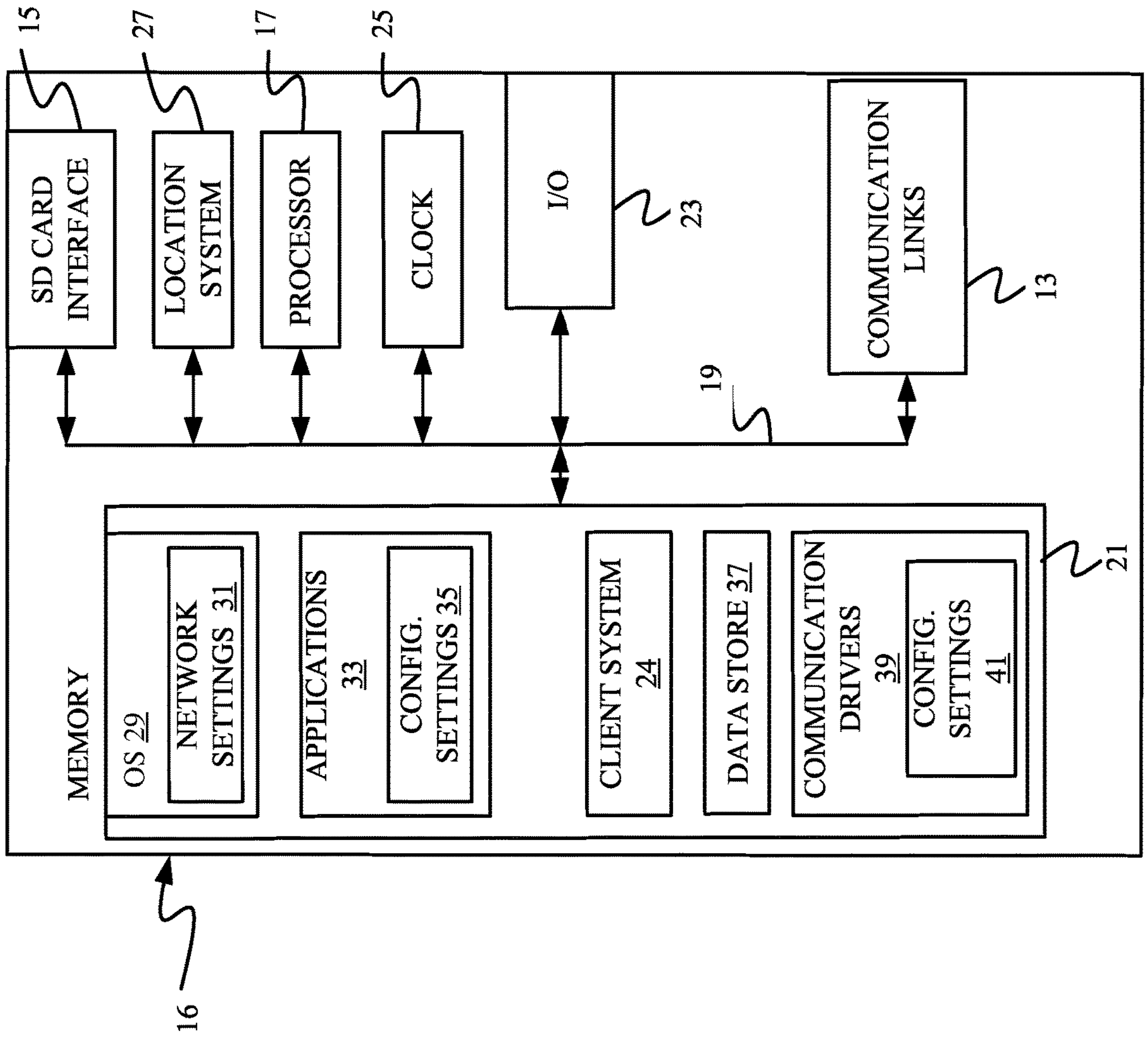
FIGS. 15-17 show examples of mobile devices that can be used in an agricultural system architecture.
Figure 16:
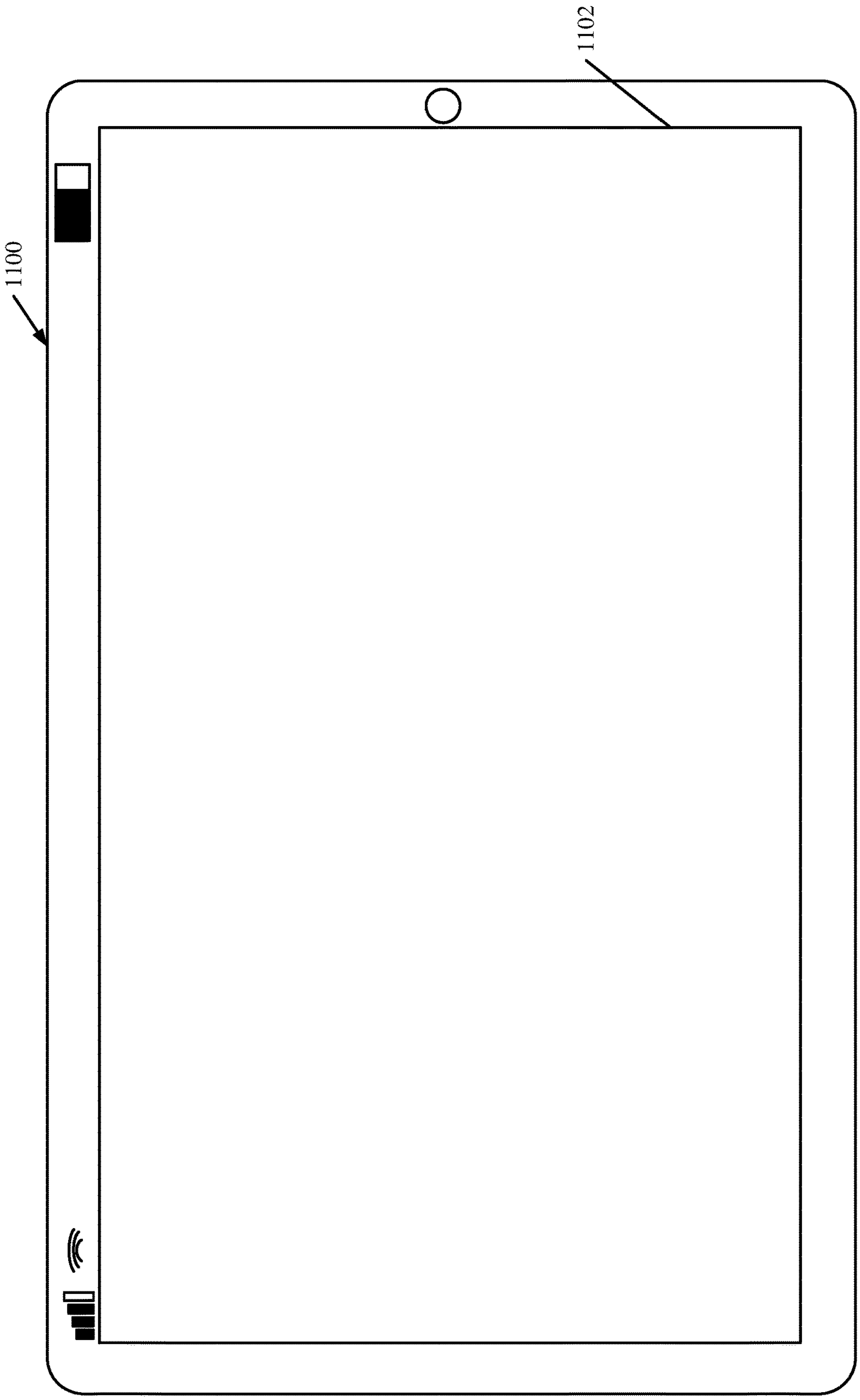
Figure 17:
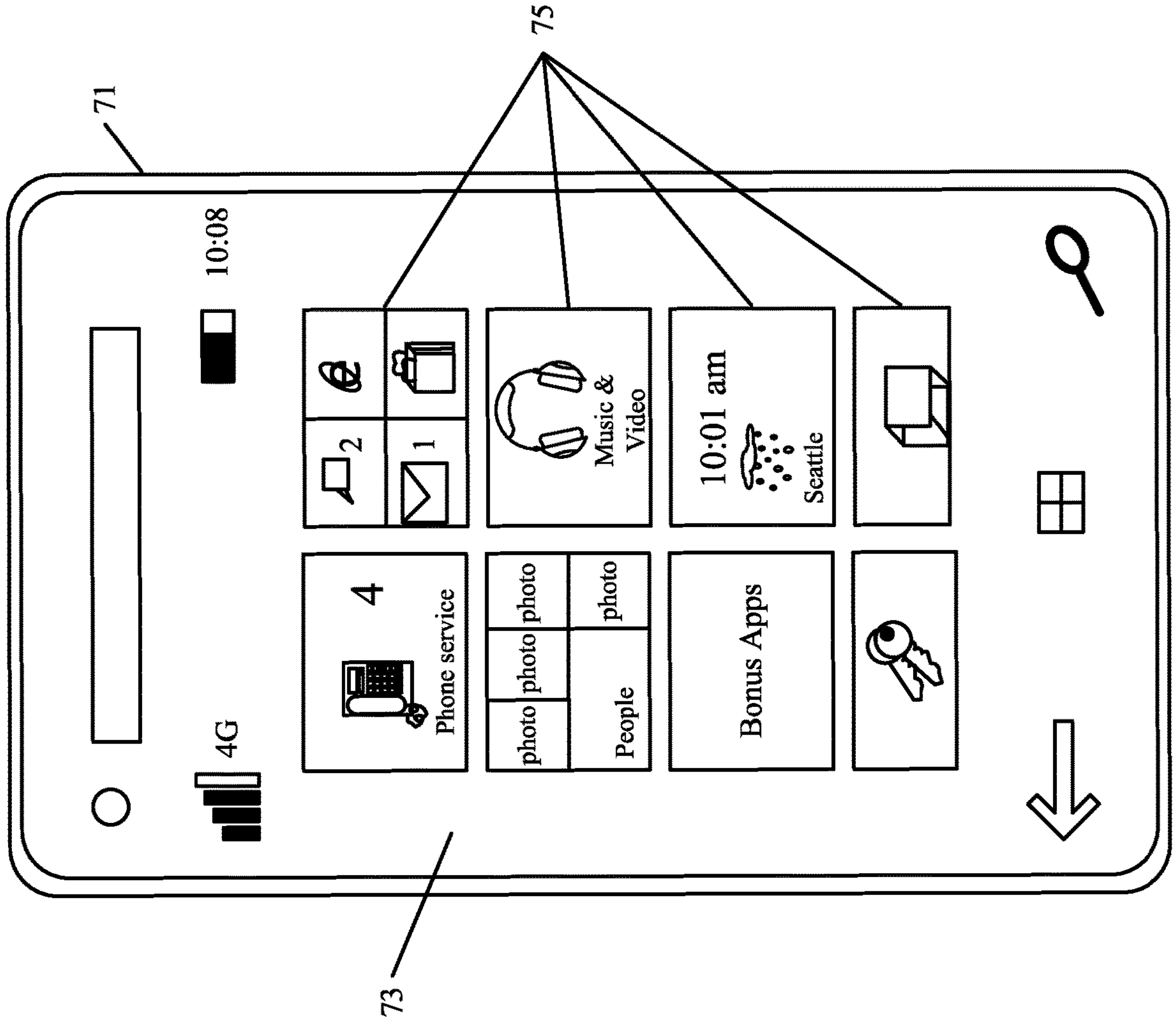

FIG. 15 is a simplified block diagram of one illustrative example of a handheld or mobile computing device that can be used as a user's or client's handheld device 16, in which the present system (or parts of it) can be deployed. For instance, a mobile device can be deployed in the operator compartment of a mobile machine (e.g., a material transfer machine 100 or a material receiving machine 200, or both) for use in generating, processing, or displaying the material transfer status outputs and interlock outputs discussed above. FIGS. 16-17 are examples of handheld or mobile devices.

FIG. 15 provides a general block diagram of the components of a client device 16 that can run some components shown in previous figures, that interact with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other figures) along a bus that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, client system 24, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 16 shows one example in which device 16 is a tablet computer 1100. In FIG. 16, computer 1100 is shown with user interface display screen 1102. Screen 1102 can be a touch screen or a pen-enabled interface that receives inputs from a pen or stylus. Tablet computer 1100, May also use an on-screen virtual keyboard. Of course, computer 1100 might also be attached to a keyboard or other user input device through a suitable attachment mechanism, such as a wireless link or USB port, for instance. Computer 1100 may also illustratively receive voice inputs as well.

FIG. 17 is similar to FIG. 16 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 18:
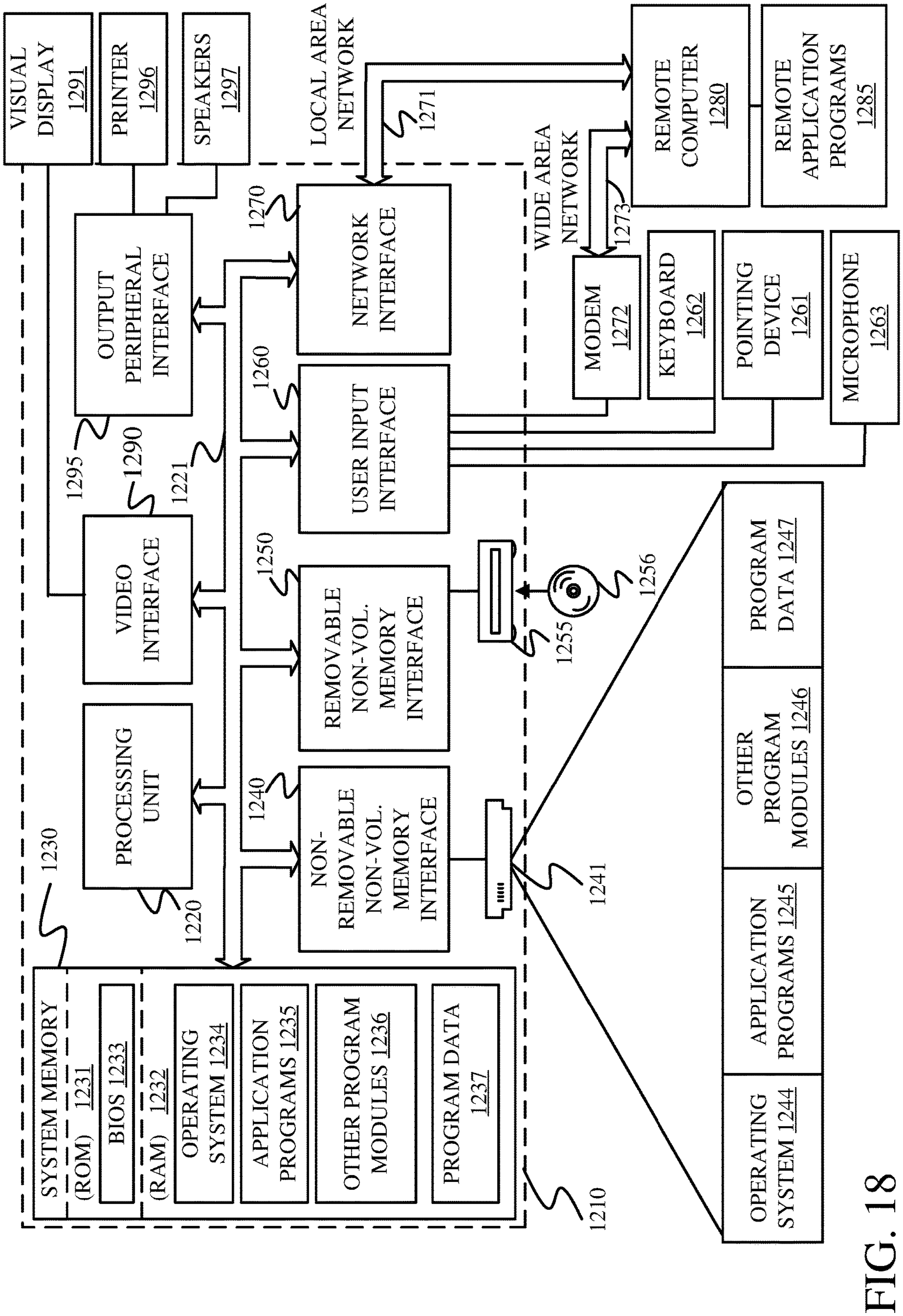
FIG. 18 is a block diagram showing one example of a computing environment that can be used in an agricultural system architecture.

FIG. 18 is one example of a computing environment in which elements of previous figures described herein can be deployed. With reference to FIG. 18, an example system for implementing some embodiments includes a computing device in the form of a computer 1210 programmed to operate as discussed above. Components of computer 1210 may include, but are not limited to, a processing unit 1220 (which can comprise processors or servers from previous figures), a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. Memory and programs described with respect to previous figures described herein can be deployed in corresponding portions of FIG. 18.

Computer 1210 typically includes a variety of computer readable media. Computer readable media may be any available media that can be accessed by computer 1210 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory or both such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data or program modules or both that are immediately accessible to and/or presently being operated on by processing unit 1220. By way of example, and not limitation, FIG. 18 illustrates operating system 1234, application programs 1235, other program modules 1236, and program data 1237.

The computer 1210 may also include other removable/non-removable volatile/nonvolatile computer storage media. By way of example only, FIG. 18 illustrates a hard disk drive 1241 that reads from or writes to non-removable, nonvolatile magnetic media, an optical disk drive 1255, and nonvolatile optical disk 1256. The hard disk drive 1241 is typically connected to the system bus 1221 through a non-removable memory interface such as interface 1240, and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 18, provide storage of computer readable instructions, data structures, program modules and other data for the computer 1210. In FIG. 18, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user may enter commands and information into the computer 1210 through input devices such as a keyboard 1262, a microphone 1263, and a pointing device 1261, such as a mouse, trackball or touch pad. Other input devices (not shown) may include a joystick, game pad, satellite dish, scanner, or the like. These and other input devices are often connected to the processing unit through a user input interface 1260 that is coupled to the system bus, but may be connected by other interface and bus structures. A visual display 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 is operated in a networked environment using logical connections (such as a controller area network-CAN, local area network-LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules may be stored in a remote memory storage device. FIG. 18 illustrates, for example, that remote application programs 1285 can reside on remote computer 1280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. An agricultural system comprising:

one or more weight sensors configured to detect a weight of material in a first material receptacle and generate sensor data indicative of the detected weight of material in the first material receptacle;

one or more processors;

memory;

computer executable instructions stored in the memory, the computer executable instructions, when executed by the one or more processors, configuring the one or more processors to:

determine a change in weight of material in the first material receptacle based on first sensor data, generated by the one or more weight sensors, indicative of a weight of material in the first material receptacle at a first time and second sensor data, generated by the one or more weight sensors, indicative of a weight of material in the first material receptacle at a second time;

determine a material transfer rate indicative of a rate at which a material transfer subsystem transfers material to the first material receptacle based on the determined change in weight of material in the first material receptacle;

determine a fill level of remaining material in a second material receptacle based on the determined material transfer rate; and control an actuator of a mobile agricultural machine based on at least one of the material transfer rate or the fill level of remaining material.

2. The agricultural system of claim 1, wherein the material transfer subsystem includes the actuator.

3. The agricultural system of claim 1 and further comprising:

a mass flow sensor configured to detect a mass flow rate of material into the second material receptacle and generate mass flow sensor data indicative of the detected mass flow rate of material into the second material receptacle, wherein the computer executable instructions, when executed by the one or more processors, further configure the one or more processors to determine the fill level of remaining material in the second material receptacle based further on the mass flow sensor data indicative of the detected mass flow rate of material into the second material receptacle.

4. The agricultural system of claim 1, and further comprising:

a mass flow sensor configured to detect a mass flow rate of material into the second material receptacle and generate mass flow sensor data indicative of the detected mass flow rate of material into the second material receptacle, wherein the computer executable instructions, when executed by the one or more processors, further configure the one or more processors to compare the determined material transfer rate and the mass flow rate.

5. The agricultural system of claim 4, wherein the computer executable instructions, when executed by the one or more processors, further configure the one or more processors to determine that the material transfer rate is less than the mass flow rate, based on the comparison, and to determine that a material transfer operation, in which material is transferred to the first material receptacle, is complete based on the determination that the material transfer rate is less than or equal to the mass flow rate.

6. The agricultural system of claim 1, wherein the computer executable instructions, when executed by the one or more processors, further configure the one or more processors to compare the determined material transfer rate to a reference value and determine whether a material transfer operation, in which material is transferred to the first material receptacle, is complete based on the comparison of the determined material transfer rate and the reference value.

7. The agricultural system of claim 1, wherein the computer executable instructions, when executed by the one or more processors, further configure the one or more processors to:

identify an engagement time indicative of a time at which the material transfer subsystem is engaged to begin transferring material to the first material receptacle;

identify a time at which the material transfer subsystem first began transferring material at or above a reference material transfer rate based on sensor data generated by the one or more weight sensors; and determine a ramp up time indicative of an amount of time the material transfer subsystem took to begin transferring material at the reference material transfer rate based on a comparison of the engagement time and the time at which the material transfer subsystem began transferring material at or above the reference material transfer rate.

8. The agricultural system of claim 7, wherein the computer executable instructions, when executed by the one or more processors, further configure the one or more processors to detect wear of the material transfer subsystem based on the determined ramp up time.

9. The agricultural system of claim 1, wherein the mobile agricultural machine comprises a controllable subsystem that includes the actuator, the controllable subsystem comprising at least one of:

the material transfer subsystem;

a propulsion subsystem; or a steering subsystem.

10. The agricultural system of claim 1, wherein the mobile agricultural machine comprises one of a material transfer machine or a material receiving machine.

11. A computer implemented method comprising:

obtaining, from one or more weight sensors, first weight sensor data indicative of a weight of material in a first material receptacle at a first time;

obtaining, from the one or more weight sensors, second weight sensor data indicative of a weight of material in the first material receptacle at a second time;

determining a change in weight of material in the first material receptacle based on the first weight sensor data and the second weight sensor data;

determining a material transfer rate indicative of a rate at which a material transfer subsystem of a material transfer machine transfers material to the first material receptacle based on the determined change in weight of material in the first material receptacle;

determining a fill level of remaining material in a second material receptacle based on the determined material transfer rate; and controlling a machine actuator based on at least one of the material transfer rate or the fill level of remaining material.

12. The computer implemented method of claim 11 wherein the material transfer machine includes the machine actuator.

13. The computer implemented method of claim 11 wherein the material transfer subsystem of the material transfer machine transfers the material to a material receiving machine that includes the machine actuator.

14. The computer implemented method of claim 11 and further comprising:

obtaining, from a mass flow sensor, mass flow sensor data indicative of a mass flow rate of material into the second material receptacle, wherein determining the fill level of remaining material in the second material receptacle comprises determining the fill level of remaining material in the second material receptacle based on the determined material transfer rate and the mass flow rate.

15. The computer implemented method of claim 14 and further comprising:

comparing the determined material transfer rate and the mass flow rate; and determining whether a material transfer operation, in which material is transferred to the first material receptacle, is complete based on the comparison of the determined material transfer rate and the mass flow rate.

16. The computer implemented method of claim 15, wherein determining whether the material transfer operation is complete based on the comparison of the determined material transfer rate and the mass flow rate comprises:

determining that the material transfer rate is greater than the mass flow rate based on the comparison of the determined material transfer rate and the mass flow rate; and determining that the material transfer operation is not complete based on the determination that the material transfer rate is greater than the mass flow rate.

17. The computer implemented method of claim 11 and further comprising:

comparing the determined material transfer rate to a reference value; and determining whether a material transfer operation, in which material is transferred to the first material receptacle, is complete based on the comparison of the determined material transfer rate and the reference value.

18. The computer implemented method of claim 11 and further comprising:

identifying an engagement time indicative of a time at which the material transfer subsystem is engaged to begin transferring material to the first material receptacle;

identifying a third time indicative of a time at which the material transfer subsystem first began transferring material at or above a reference material transfer rate based on third weight sensor data generated by the one or more weight sensors; and determining a ramp up time indicative of an amount of time the material transfer subsystem took to begin transferring material at the reference material transfer rate based on the engagement time and the third time.

19. The computer implemented method of claim 18 and further comprising:

detecting wear of the material transfer subsystem of the material transfer machine based on the determined ramp up time.

20. A material transfer machine comprising:

a material receptacle configured to hold material;

a material transfer subsystem configured to transfer the material;

one or more processors;

memory, computer executable instructions, stored in the memory, the computer executable instructions, when executed by the one or more processors, configuring the one or more processors to:

obtain first weight sensor data generated by one or more weight sensors on a material receiving machine, the first weight sensor data indicative of a weight of material in a material receptacle of the material receiving machine at a first time;

obtain second weight sensor data generated by one or more weight sensors on the material receiving machine, the second weight sensor data indicative of a weight of material in the material receptacle of the material receiving machine at a second time;

determine a change in weight of material in the material receptacle of the material receiving machine based on the weight of material in the material receptacle of the material receiving machine at the first time and the weight of material in the material receptacle of the material receiving machine at the second time;

determine a material transfer rate indicative of a rate at which the material transfer subsystem transfers material to the material receptacle of the material receiving machine based on the determined change in weight of material in the material receptacle of the material receiving machine;

determine a fill level of material, remaining in the material receptacle of the material transfer machine after the second time, based on the determined material transfer rate; and control an actuator of at least one of the material transfer machine or the material receiving machine based on at least one of the material transfer rate or the fill level of material.

* * * * *